United States Patent Office 2,742,067
Patented Apr. 17, 1956

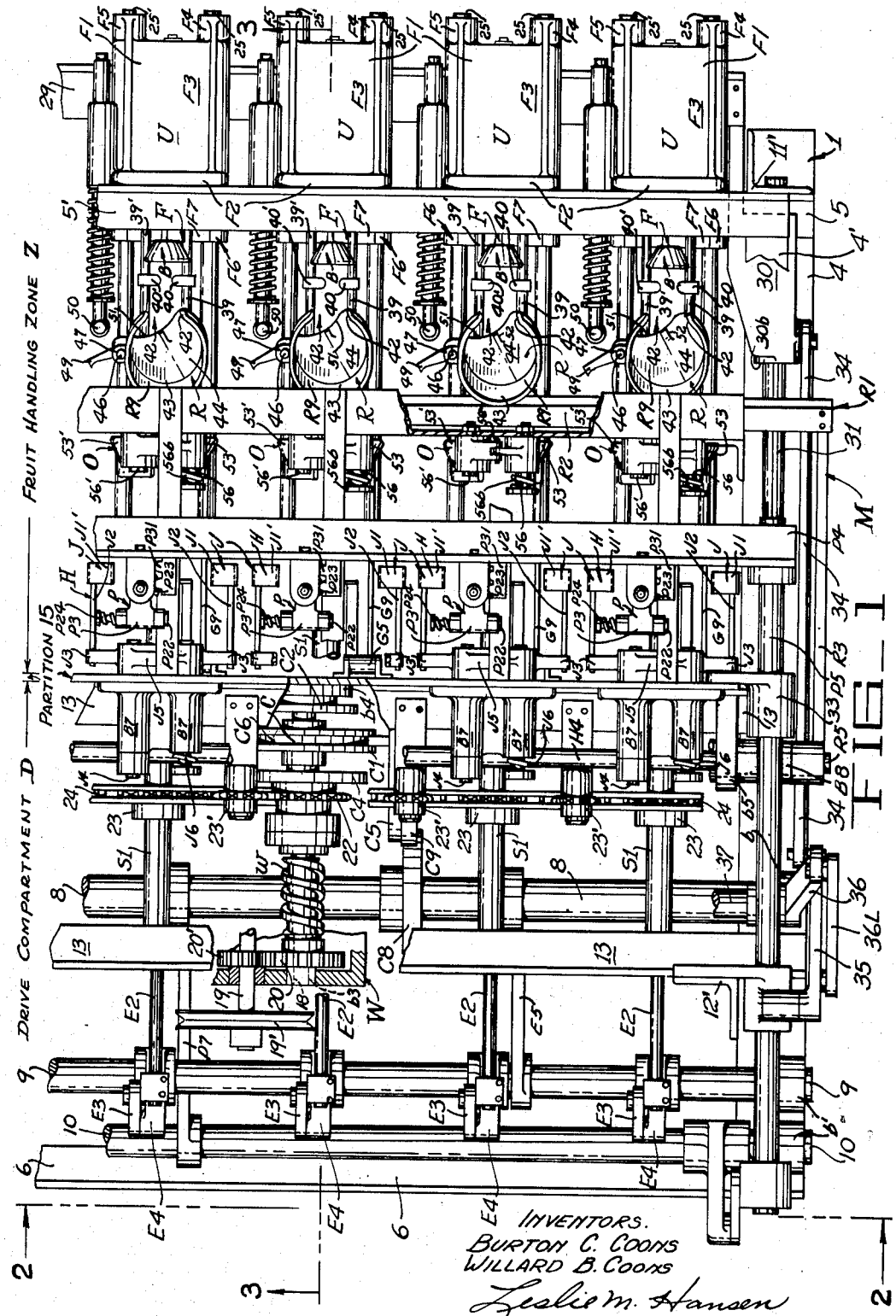

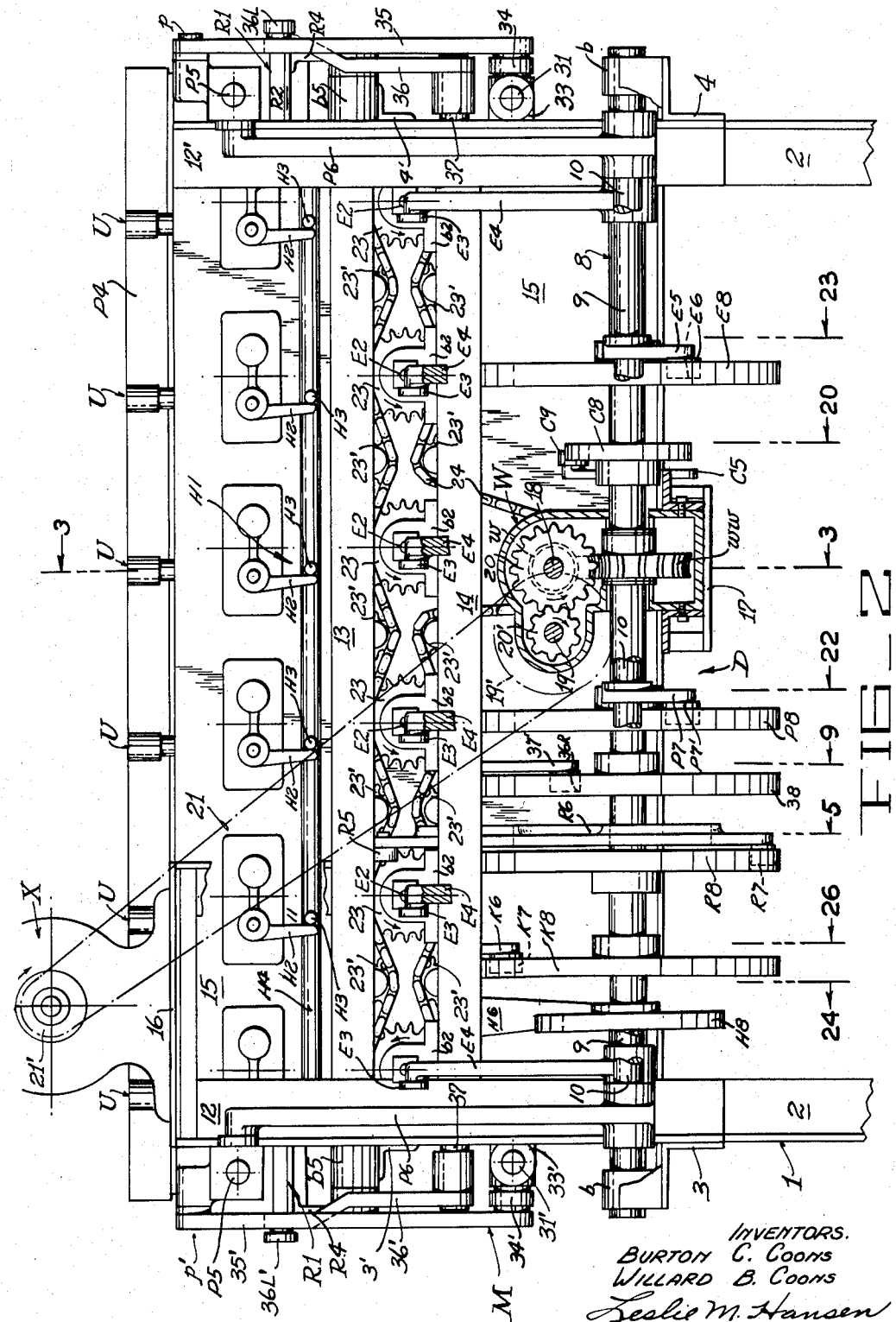

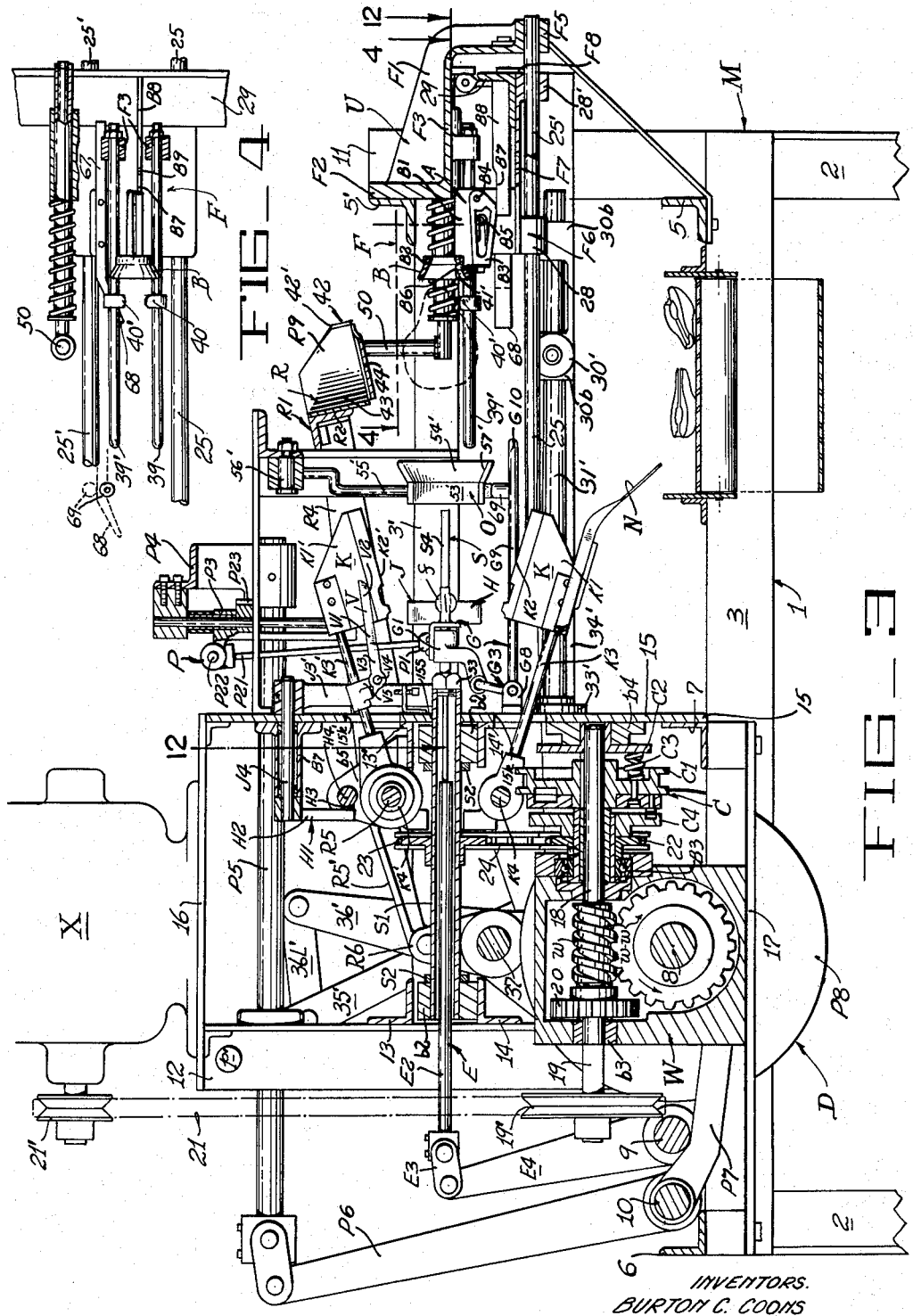

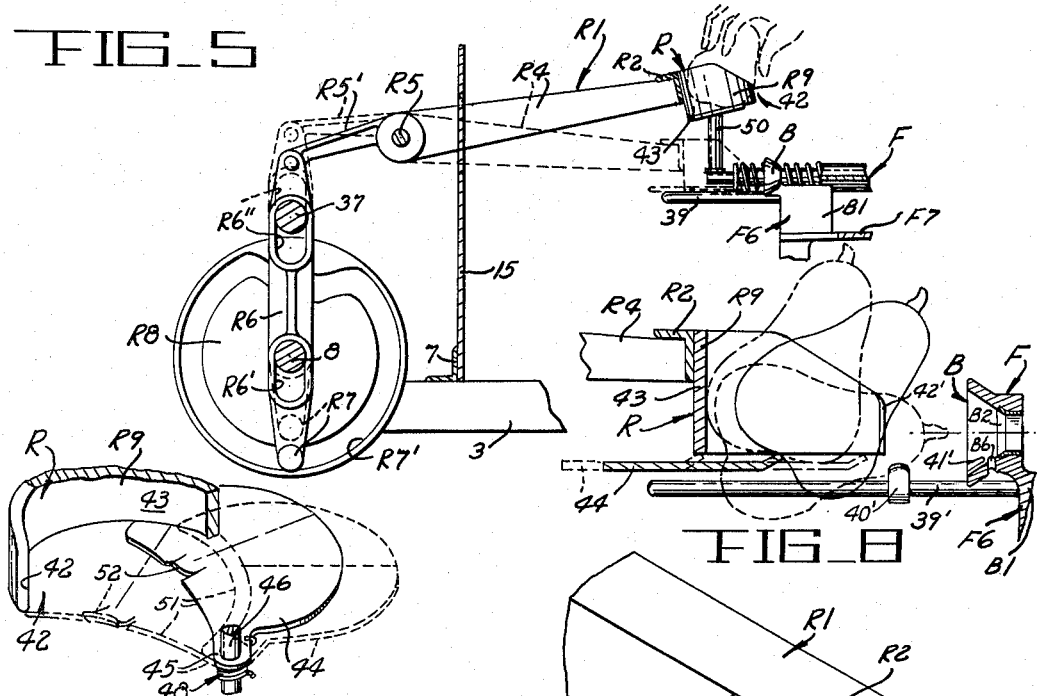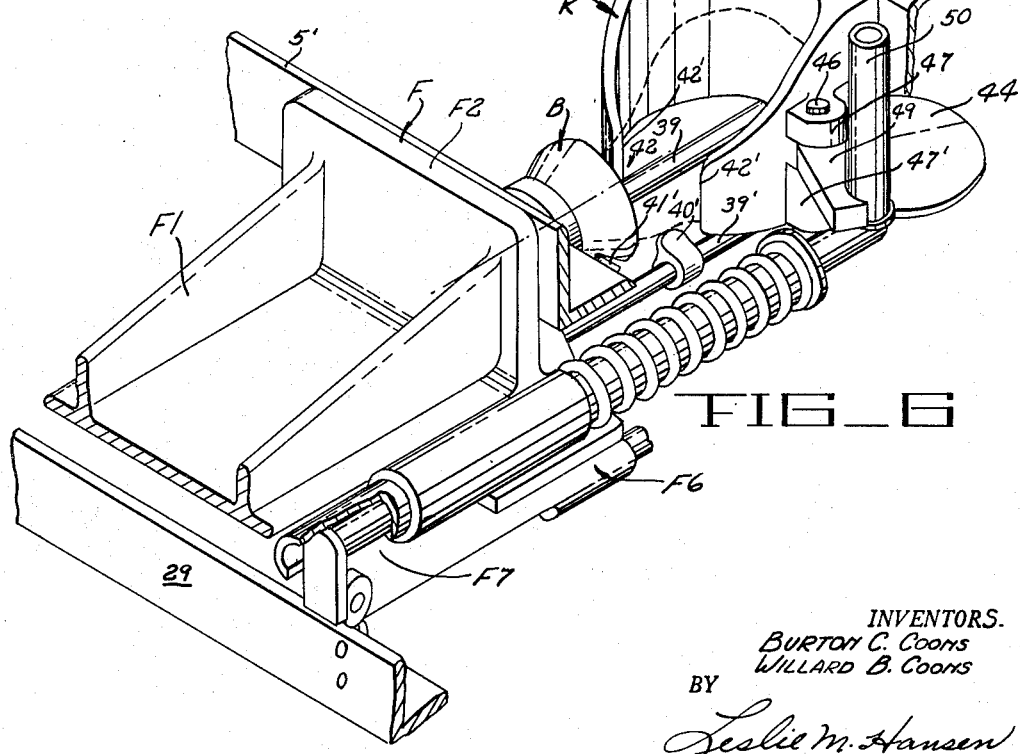

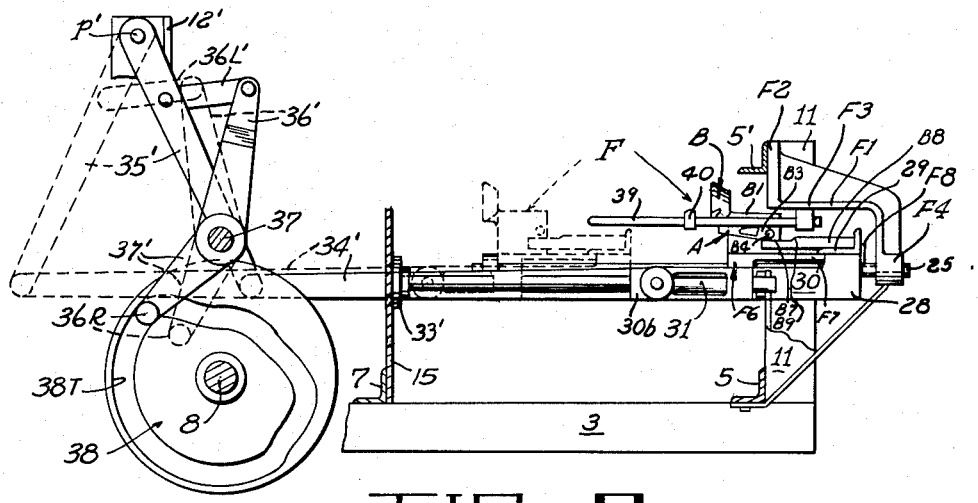
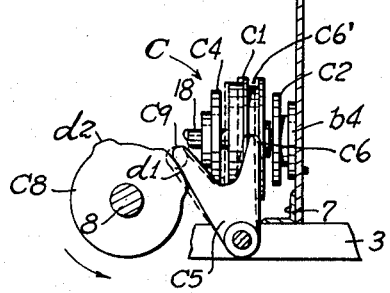
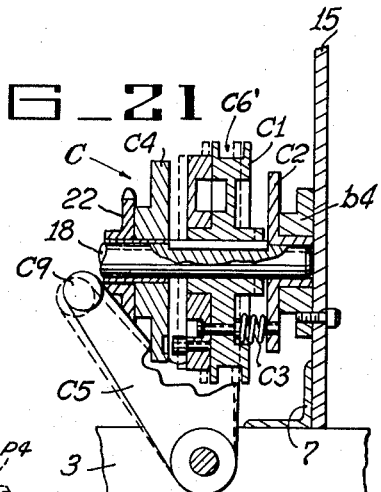
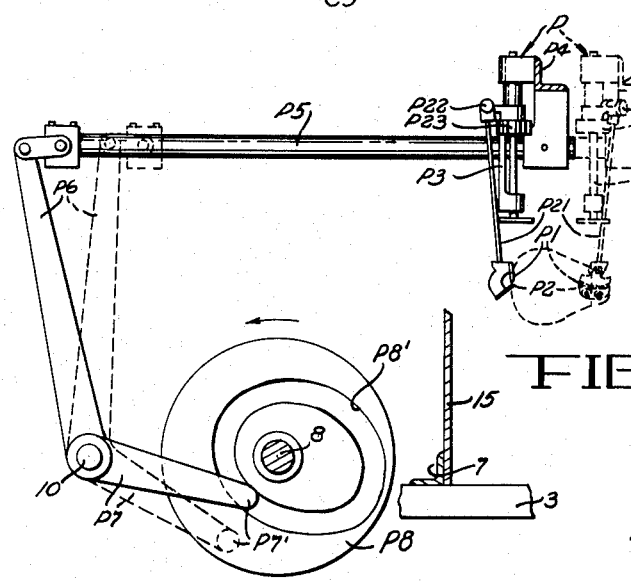

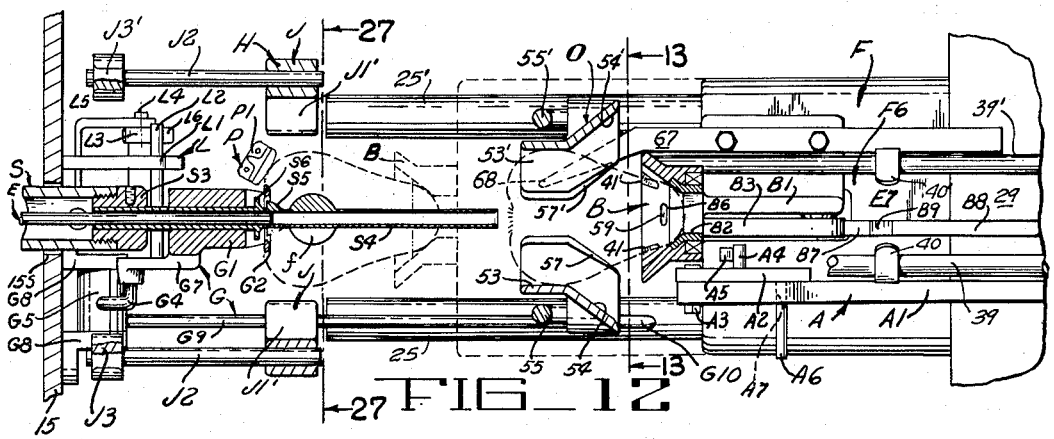
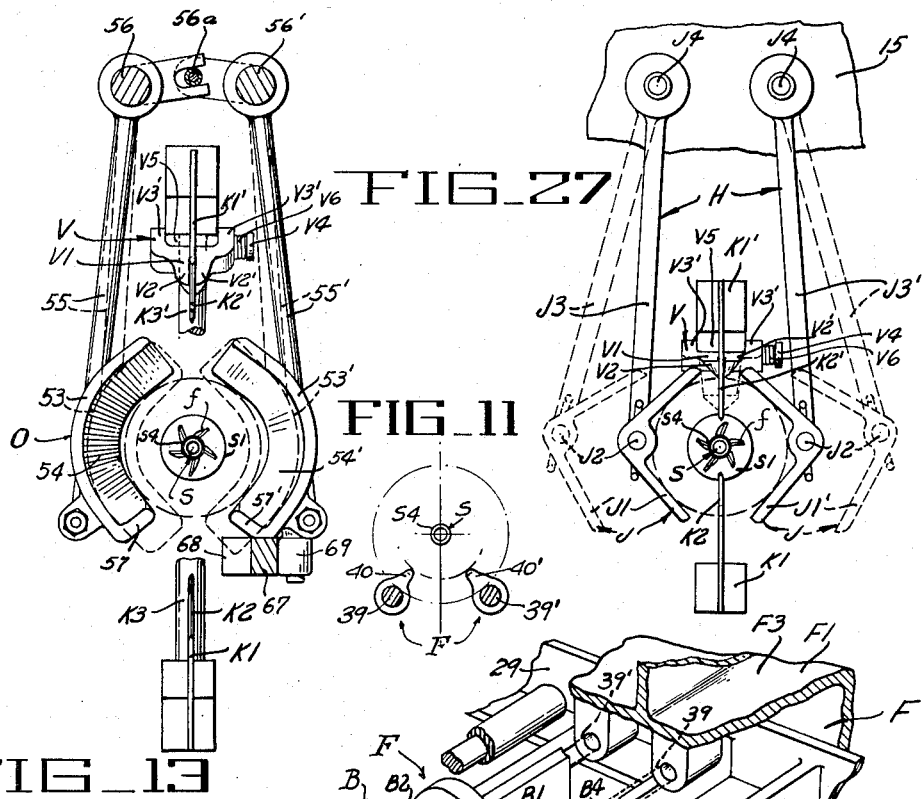
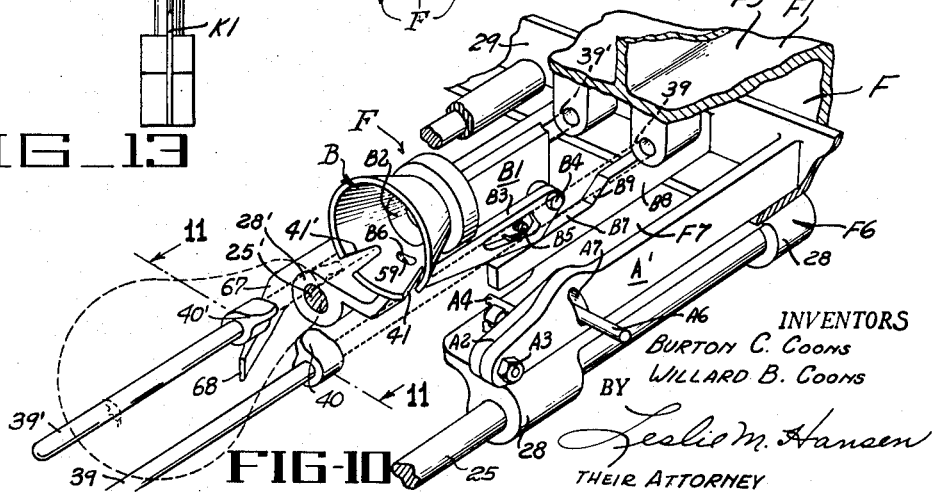

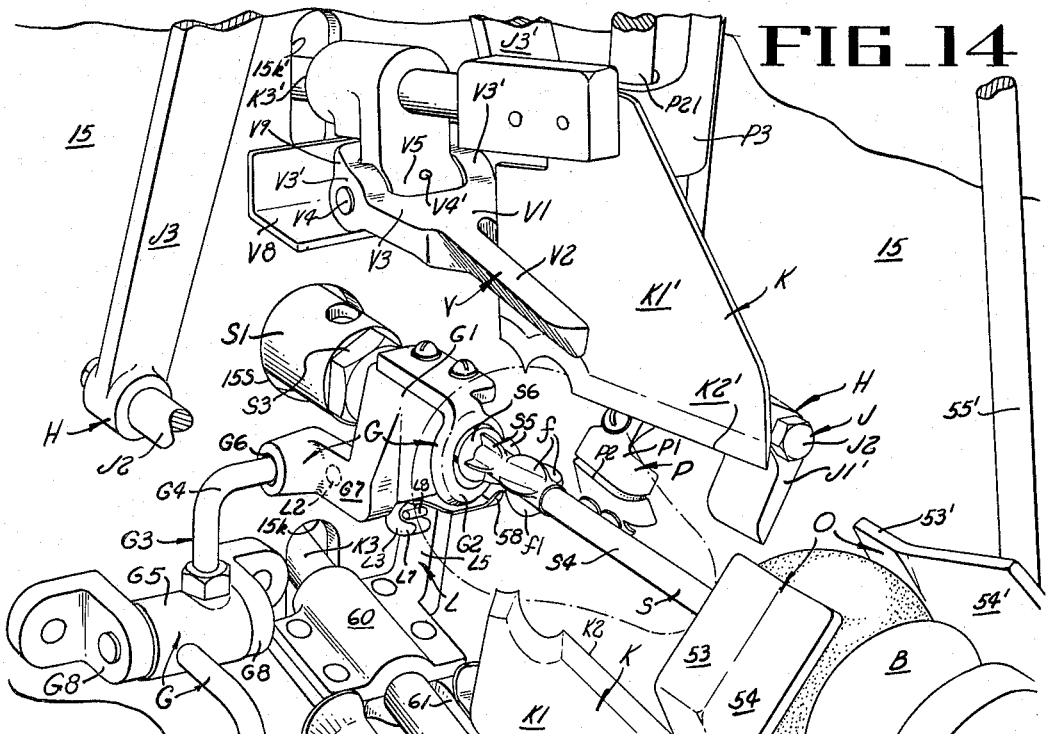
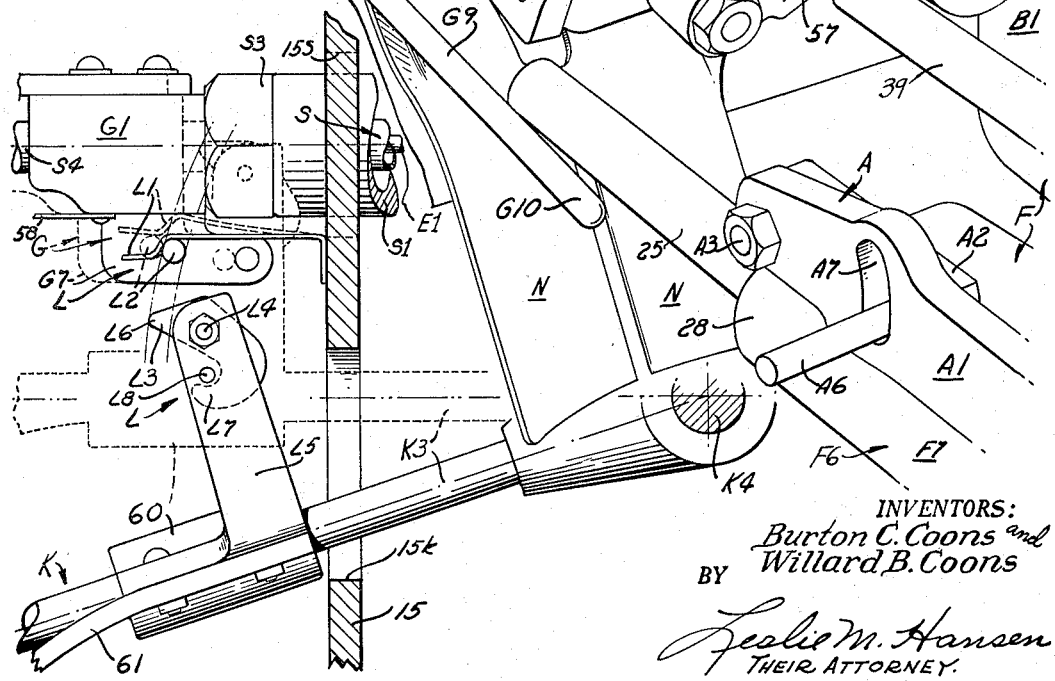

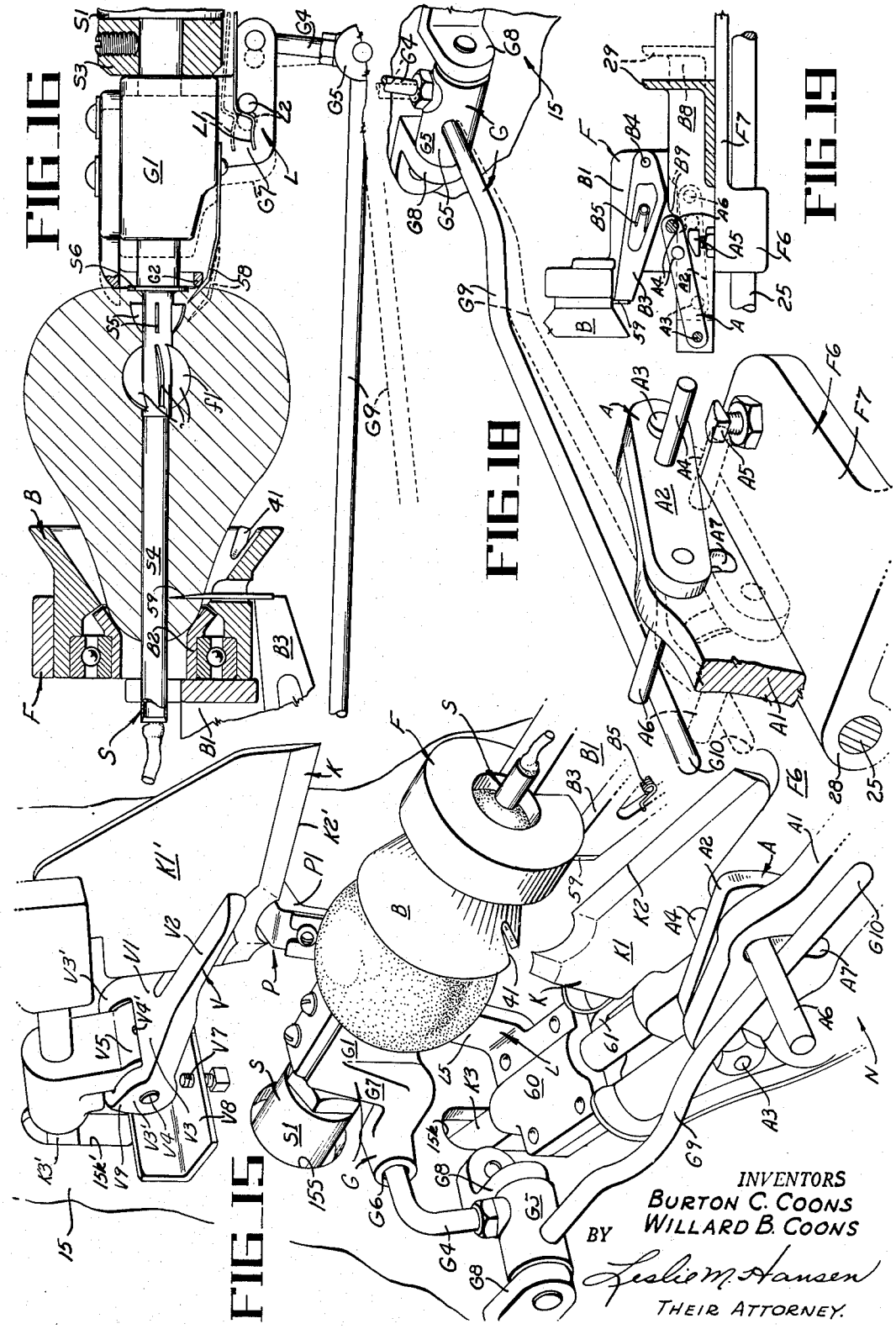

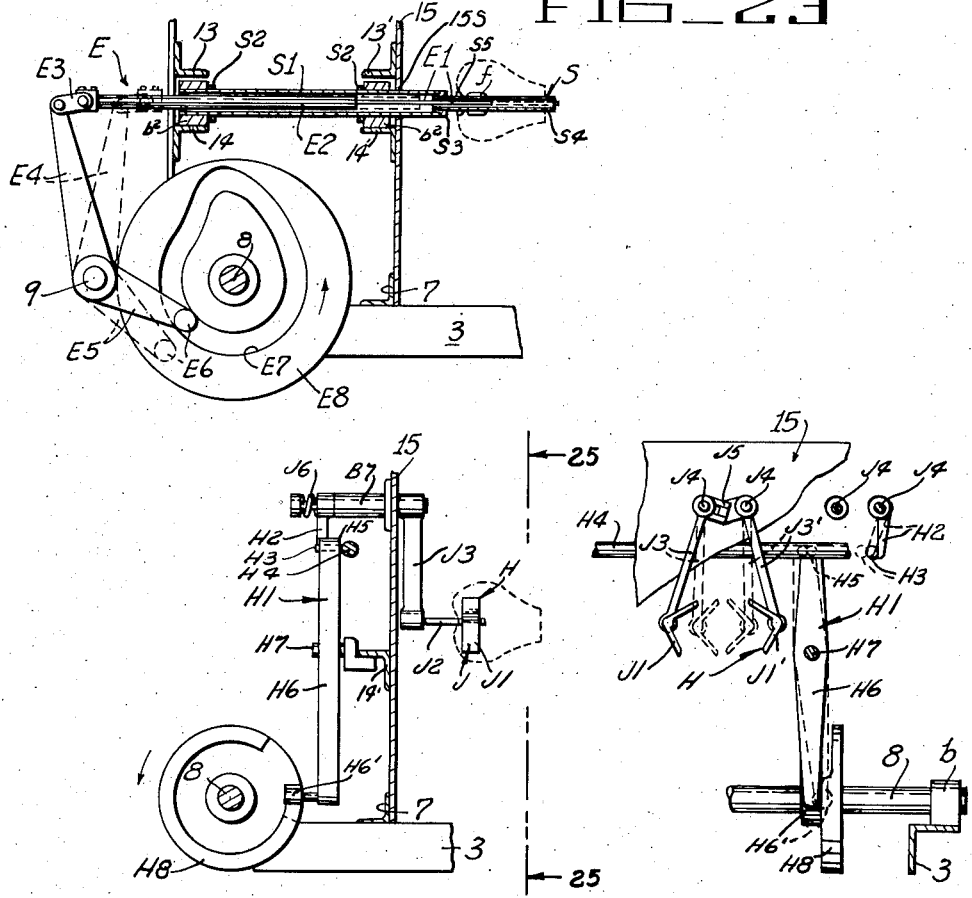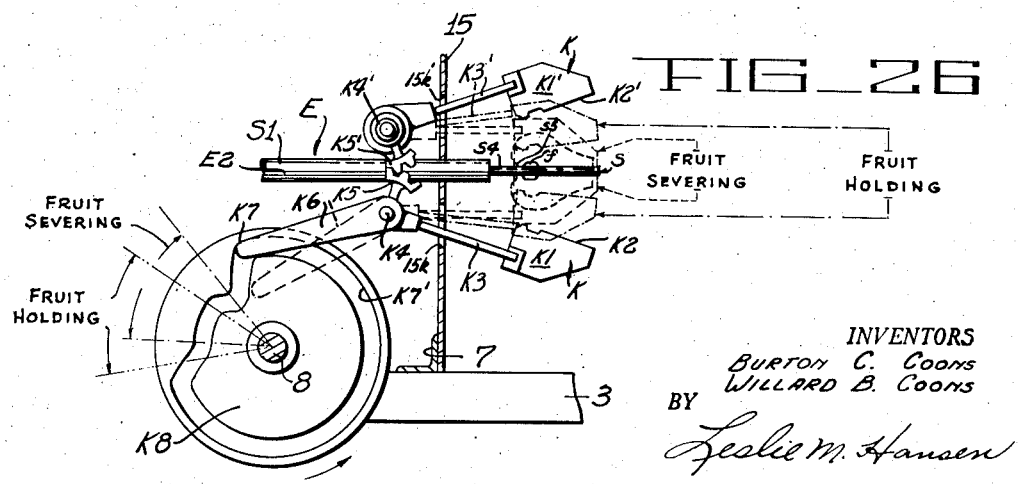

2,742,067

PEAR FEEDING, STEMMING, END TRIMMING, PEELING, SEED CELLING, AND HALVING MACHINE

Burton C. Coons, San Jose, and Willard B. Coons, Santa Clara, Calif.

Application March 29, 1952, Serial No. 279,428

31 Claims. (Cl. 146—33)

This invention relates to apparatus for preparing pome type fruit such as pears and the like for preservation by canning. More particularly this invention relates to apparatus for peeling, coring, stemming and seed-celling fruit such as pears in a simple, facile and effective manner.

Numerous forms and types of devices have been developed for obtaining the ultimate results above stated. However, the present invention contemplates the provision of apparatus having certain advantages and embodying new and novel improvements in construction and operation for obtaining the aforesaid ultimate results in a more efficient, simple and effective manner.

It is an object of this invention to provide a pear preparation machine in which fruit of indiscriminate size can be prepared, i. e., irrespective of grading of the fruit.

It is one object of this invention to provide automatic fruit receiving and semi-orienting mechanism for depositing a fruit onto a fruit feeding mechanism in a predetermined position for advancement toward a spindle in a particular manner.

It is an object of this invention to provide a general arrangement of fruit receiving and fruit feeding mechanism coordinated for feeding pears and the like to a fruit supporting and turning spindle in oriented position.

Another object is to provide in a fruit supporting spindle, a coupling means so related to the spindle as to turn the fruit therewith and subsequently remove the seed cells from the fruit without removing the fruit from the spindle.

Another object is to provide means for determining the stroke of the fruit feeding mechanism dependent upon the length of the fruit to thereby limit movement of the fruit relative to the spindle when the seed cells of such fruit register with the coupling means on the spindle.

Yet another object is to provide fruit aligning means for positioning each fruit with its stem to blossom axis coaxial with the spindle irrespective of the size of fruit being fed onto the spindle.

Still another object is to provide fruit halving means coordinated with the fruit supporting spindle for releasing each fruit from said spindle during a dwelling period thereof.

A further object is to provide fruit holding means for embracing the outer periphery of each fruit during the seed-celling operation of the spindle and the coupling means thereof. In connection with the foregoing, it is an object to resist turning of the fruit during the seed-celling operation through the medium of partial action of the fruit halving means in conjunction with the fruit holding or embracing operation aforesaid.

These and other objects and advantages of the present invention will become apparent in the following description when read in the light of the drawings in which:

Fig. 1 is a fragmentary top plan view of a machine embodying a plurality of fruit handling units constructed in accordance with the invention.

Fig. 2 is an end view of the machine shown in Fig. 1, taken along line 2—2 thereof, and showing the main or common drive of the machine.

Fig. 3 is a longitudinal section through the machine shown in Fig. 1, and taken substantially along line 3—3 thereof.

Fig. 4 is a fragmentary plan view, partially in section, of a feed mechanism embodied in the present invention, said view being taken substantially along line 4—4 in Fig. 3.

Fig. 5 is an independent detail section of a fruit receiving cup and semi-orienting mechanism including the drive therefor and taken substantially along line 5 in Fig. 2.

Fig. 6 is a perspective view of a fruit receiving cup as it appears while depositing a fruit onto the feed mechanism.

Fig. 7 is a fragmentary perspective view illustrating the semi-orienting mechanism as shown in Figs. 5 and 6.

Fig. 8 is a longitudinal section illustrating the semi-orienting of a pear during deposit thereof onto the feed mechanism.

Fig. 9 is an independent detail section taken substantially along line 9 in Fig. 2, to show the feed mechanism and its drive connection to the common drive of the machine.

Fig. 10 is a fragmentary perspective view of the feed mechanism about to advance toward a fruit deposited thereon.

Fig. 11 is a cross section of Fig. 10 taken along line 11—11 thereof.

Fig. 12 is an enlarged horizontal plan section taken substantially along line 12—12 in Fig. 3, illustrating centering of the fruit during advancement thereof and incident to impalement of the fruit upon the fruit turning spindle.

Fig. 13 is a vertical section partially in elevation taken substantially along line 13—13 in Fig. 12, showing jaws for centering the fruit relative to the spindle during advancement by the feed mechanism toward the same.

Fig. 14 is an enlarged perspective view of the one fruit preparing unit substantially as shown in Fig. 13 about to receive a fruit on its spindle.

Fig. 15 is a fragmentary perspective view similar to that of Fig. 14 showing the fruit fully on the spindle.

Fig. 16 is an enlarged vertical section through the spindle as illustrated in Fig. 15, and illustrating a gauging mechanism operable upon engagement by the blossom end of a fruit on the spindle.

Fig. 17 is a detail of a latch for holding and releasing the trip arm shown in Figs. 14 and 16.

Fig. 18 is a fragmentary perspective view of the trip arm and an automatic release coupling relative to the gauging mechanism for staying advancement of the fruit by the feed mechanism incident to the final stroke of its drive.

Fig. 19 is a fragmentary vertical section, partially in elevation, illustrating the coupling mechanism as well as the stem-end trimming mechanism of the unit.

Fig. 20 is a section taken substantially along line 20 in Fig. 2 to show a clutch mechanism between the spindle turning mechanism and the main drive.

Fig. 21 is an enlarged partial section through the clutch shown in Fig. 20.

Fig. 22 is an independent detail section taken substantially along line 22 in Fig. 2 to show the peeling mechanism and its connection to the common drive.

Fig. 23 is an independent detail view taken substantially along line 23 in Fig. 2, showing the core ejecting mechanism for removing the fruit core from the spindle.

Fig. 24 is an independent detailed view taken substantially along line 24 in Fig. 2, showing mechanism for gripping and holding the sides of a fruit momentarily during the seed-celling operation.

Fig. 25 is a detail elevation taken from line 25—25 in Fig. 24, to illustrate the drive mechanism for the fruit gripping and holding means.

Fig. 26 is an independent detail view taken substantially along line 26 in Fig. 2 showing fruit halving knives and their connection to the common drive.

Fig. 27 is a cross sectional view taken substantially alone line 27—27 in Fig. 12, showing the fruit holding mechanism and fruit halving knives in relation to the spindle and fruit.

General description

The machine of the present invention, generally designated M in the drawings, includes a plurality of units U each adapted to prepare one piece of fruit at a time in unison during each cycle of operation of the machine. These units U are identical in construction except for their interconnections and common drive mechanisms and for this reason like reference numerals indicate like parts of each of the several units in the machine.

All units U are driven by a common drive mechanism D in unison with each other, there being other associated mechanisms, later to be described, for operating certain parts of each unit in steps and in timed relation with each other for accomplishing the ultimate result. The number of units U employed in each machine is determined by the speed of operation thereof and the speed at which the fruit is deposited into the machine. If the fruit is fed into the machine mechanically the speed of the machine can be increased accordingly. However, when the fruit is fed in by hand the speed of operation must be regulated according to the ability and capacity of an attendant to supply the fruit in proper order.

In the present disclosure, six units U are shown embodied in the one machine, see Fig. 2, it being understood, however, that the number of units employed can be increased or diminished as necessity may require. Six units have proven to be the number which one attendant can handle satisfactorily without over-exertion or skipping of any one unit during each cycle of operation of the machine. Each unit U includes a spindle S, a feed mechanism F and a transfer or semi-orienting mechanism R for receiving individual fruit from the hands of an attendant and for depositing that fruit in semi-oriented condition on the feed mechanism F for movement thereby onto the spindle S.

Each unit also includes fruit centering mechanism O cooperable with the feed mechanism F for aligning the stem-blossom axis of a fruit with the axis of the spindle S incident to movement of the fruit onto the spindle. The fruit thus becomes impaled upon the spindle for axial rotation therewith. The spindle S includes a plurality of fins $f$ disposed to be embedded in the fruit for turning the latter with the spindle. The spindle S is driven directly from the drive mechanism D and is automatically controlled by a clutch C to dwell at specified points in each cycle of operation of the unit.

A peeling mechanism P is provided for removing the skin from a pear as it turns with the spindle S by the coupling action of the fins $f$. The fins $f$ subsequently function as a seed celling device cooperable with fruit holding means H which intermittently function to resist turning of the fruit while the fins function to ream out the seed cells thereof. A gauge means G cooperates with the feed mechanism for detecting complete impalement of a fruit upon the spindle and functions to automatically release a coupling mechanism A between the feed mechanism and a fruit engaging cup B thereof for limiting movement of the fruit thereby onto the spindle after the seed cells of the particular fruit register substantially with the fruit turning and seed celling fins $f$.

The fruit holding means H by which the fruit is held during the seed celling operation comprises a pair of fruit embracing jaws J and a pair of knives K. These knives K cooperate with the fruit embracing jaws J for the purpose aforesaid in addition to splitting the fruit into halves during a dwell period of the spindle by automatic operation of the clutch C. Means V on one of the knives K effects spreading the fruit halves apart for releasing the fruit from the dwelling spindle so that the severed halves of fruit fall by gravity onto a discharge chute N disposed below the spindle.

Multiple unit machine, frame and common drive

Referring now to Figs. 1, 2 and 3, the machine M includes a frame 1 having legs 2 and parallel side angles 3 and 4 joined at their front and rear ends by transverse angle iron bars 5 and 6, respectively. The side angles 3—4 are also joined by a medial angle iron 7 substantially midway their ends and support bearings $b$ for a common drive shaft 8 which is disposed slightly to the rear of the medial angle iron 7. Rocker arm shafts 9 and 10, later to be explained, are supported transversely the frame by bearings $b'$ also secured to the side angles 3 and 4 in the region thereof to the rear of the drive shaft 8.

Fore and aft towers 11 and 12 are supported on the side angle 3 and like towers 11' and 12' are supported on the side angle 4. The towers 11 and 11' are slightly shorter than the towers 12 and 12' and are secured to the transverse angle 5 so as to extend vertically above the legs 2 at the extreme front end of the respective side angles 3 and 4. The taller or aft towers 12 and 12' have their lower ends secured to the respective side angles 3 and 4 so as to extend upwardly therefrom between the common drive shaft 8 and the rocker shafts 9 and 10. The aft towers 12 and 12' are joined by parallel cross bars 13—14 spaced from each other and secured to the towers 12—12' about midway their ends. The fore and aft towers 11 and 12 are joined by upper angle irons 3' secured to the cross bars 13—14 as well as a transverse angle iron 5' secured to the upper ends of the fore towers 11—11'. The fore and aft towers 11'—12' are joined by upper angle irons 4' likewise secured to the transverse angle 5' and the cross bars 13—14 in the same manner as shown in Fig. 3. The upper ends of the fore towers 11—11' are thus securely joined by the upper angle iron 5' directly above the fore angle iron 5.

As best seen in Figs. 1 and 3, a medial partition 15, in the form of a heavy plate or panel, is disposed upright between the fore and aft ends of the frame 1 and transversely thereof for end support by the upper angle irons 3'—4'. The lower edge of the partition 15 is also suitably secured to the vertical flange of the medial angle iron 7, Fig. 3. By this partition 15 the drive mechanism D of the machine is separated from the fruit handling mechanism thereof so as to provide an aft or drive compartment on one side of the partition 15 and a fore or fruit handling compartment or zone Z on the other side of the partition 15. The partition 15 also carries parallel cross bars 13'—14' comparable to the cross bars 13—14, aforementioned. These cross bars 13'—14' extend to the upper side angles 3'—4' to which they are secured and thereby cooperate with the cross bars 13—14 to provide support for bearings $b2$ by which the spindles S are journaled for rotation about horizontal axes within the frame 1.

As best seen in Fig. 3, the partition 15 extends to the same height as the aft towers 12—12' and cooperate therewith for supporting a plate 16 providing a platform upon which a source of power X in the form of an electric motor is secured. Another plate 17 is suspended from the lower face of the medial angle iron 7 and the rearmost transverse angle iron 6 for supporting a gear box W through which the common drive shaft 8 extends. Within this gear box is a worm wheel $ww$ secured to the drive shaft 8 for meshing relation with a worm $w$ formed on an auxiliary shaft 18 suitably journaled in bearings $b3$ provided in the walls of the gear box W so as to extend perpendicularly with respect to and above the common drive shaft 8. The gear box W also supports a floating shaft 19 in like manner as and parallel to the auxiliary shaft 18 and these two shafts 18—19 are drivingly connected by meshing gears 20 and 20'. The floating shaft 19 has one end thereof extending through the aft side of the gear box W to receive a sheave 19' which is keyed to the shaft 19. This sheave 19' is drivingly connected by a belt 21 to a smaller sheave 21' secured to the drive shaft of the motor X.

The auxiliary shaft 18 extends from the gear box W into a suitable bearing boss b4 (Fig. 21) secured to the partition 15. The clutch mechanism C (Figs. 3, 20 and 21) is arranged on the shaft 18 and includes a drive disc C1 keyed to shaft 18 for rotation therewith and sliding movement thereon. A stationary base disc C2 mounted on the free end of the shaft 18 carries a plurality of springs C3 disposed to urge the drive disc C1 toward a driven disc C4. The driven disc C4 is secured to a sprocket 22 for free floating rotation therewith upon the shaft 18 and is adapted to be driven by the drive disc C1 when the disc C4 is coupled therewith by studs on the drive disc C1 seating in recesses in the disc C4 in a conventional manner.

Each spindle S includes a tubular shaft S1, journaled as aforesaid in the bearings b2, and a sprocket 23 is secured to each shaft S1 midway between the bearings b2. An endless chain 24 is trained around the sprocket 22 and each of the sprockets 23 (Figs. 1 and 2) there being idler sprockets 23' between the several spindle sprockets 23 and suitably supported within the frame 1 for maintaining the chain 24 in driving relation with the spindle sprockets.

The clutch mechanism C is controlled for operation by means of a dog-leg lever C5 (Figs. 1, 20 and 21), pivotally mounted within the frame 1. One arm of lever C5 carries a roller C6 projected into an annular groove C6' in the periphery of the drive disc C1 and the other arm of lever C5' carries a roller C9 bearing against the periphery of a cam C8 secured to the common drive shaft 8.

The springs C3 in the clutch mechanism C normally urge the driven disc C1 into driving relation with the floating disc C4 and sprocket 22. By the same token dog-leg lever C5 is also urged (anti-clockwise Figs. 20–21) to press the roller C9 toward the periphery of the cam C8 to thereby effect turning of all spindles. However, it will be noted that cam C8 has two acclivities d1 and d2. When the roller C9 is on either of these acclivities d1 or d2 the dog-leg lever C5 is forced clockwise (Figs. 20–21) to urge the drive disc C7 away from the floating disc C4 against the action of the springs C3. In this manner all of the spindles are caused to dwell twice during each cycle of operation of the machine, dwell one occurring when the cam roller C9 is on acclivity d1 and dwell two occurring when roller C9 is on acclivity d2 of cam C8. Dwell one (d1) is for causing the spindle to dwell at the final or fruit halving stage of one cycle of operation as well as the fruit impaling stage at the beginning of the next cycle of operation of the machine. Dwell two (d2) is for causing the spindle to dwell intermediate the start and finish of each cycle to enable the fruit holding means H to engage the fruit on the spindle for reasons later to become apparent.

Spindles

Each spindle S, as above explained, includes a tubular shaft S1 journaled for rotation in the bearings b2. Suitable collars S2 on the shaft S1 serve to maintain the latter in a proper position within the frame 1 with the fore end of the shaft S1 extended through an opening 15s provided in the partition 15. The fore end of shaft S1 is disposed slightly beyond the partition 15 and has a bushing S3 secured thereto from which a coring tube S4 extends a distance sufficient to receive and support a whole pear or like fruit thereon.

It is the coring tube S4 which carries the fruit turning and seed celling fins f, hereinbefore mentioned, they being disposed along the length of the coring tube so as to register with the seed cell zone of a fruit impaled upon the coring tube as best seen in Figs. 12 and 16. The coring tube S4 also has a plurality of fin-like blades S5 of substantial triangular configuration adapted to trim the blossom end of a fruit disposed upon the coring tube. It should be noted that these blossom end trimming blades S5 are disposed a distance rearwardly of the seed celling fins f calculated to cut a countersunk recess in the blossom end of the fruit at a proper distance from the seed cell zone thereof which is in register with the fins f.

As best illustrated in Figs. 13 and 27, the fins f have a slight leading tilt relative to the direction of rotation of the spindles S. In this manner the segmental spaces between the fins f have a wedge shape in a leading direction which in effect firmly pockets and retains the pulp in the seed cell zone of the fruit to assure turning of the fruit with the spindle. Therefore, even despite the slight resistance to turning afforded against the fruit by the peeling mechanism P the fruit will turn due to pocketing of the fruit pulp in the leading angle provided between each fin f. The triangular blossom end trimming fins S5 on the spindle also aid and assist in providing a firm coupling between the spindle and fruit during the peeling operation.

Core ejector

The coring tube S4 has a central passage of a diameter suitable to admit the fibrous stem core of a fruit. Consequently, when a whole fruit is advanced toward and impaled upon the coring tube in axial alignment therewith the fruit is cored along its stem-blossom axis simultaneously with the impalement of the fruit on the coring tube.

A core ejector E (Fig. 23) is provided for removing the fibrous matter from the coring tube S4 once in each cycle of operation of the machine. The core ejector E comprises a plunger E1 disposed for sliding movement coaxially of and within the spindle shaft S1 and coring tube S4. This plunger E1 extends forwardly from a rod E2 suitably supported for axial movement within the spindle shaft S1, the aft end of rod E2 being pivotally connected as at E3 to the free end of a rocker arm E4 mounted upon the rocker shaft 9 (Figs. 3 and 23). A companion arm E5 secured to the shaft 9 carries at its free end a roller E6 which extends into a cam track E7 formed in a cam E8 secured to the common drive shaft 8 for rotation therewith. The shape of the cam track E7 is such that the rod E2 and core ejecting plunger E1 dwell for an appreciable part of each cycle of operation and for the balance thereof reciprocate within the tubular shaft S1 and coring tube S4 once in each cycle of operation of the machine for removing core pulp from the coring tube.

Feed mechanism F

Each feed mechanism F comprises a bracket F1 having a vertical flange F2 secured to the transversely disposed upper angle iron 5' as best seen in Figs. 1, 3, 9 and 10. Each bracket F1 has a forwardly extending braced web F3 terminating in a pair of depending portions each provided with a boss F4 and F5 bored to receive guide rods 25 and 25' respectively. These guide rods 25—25' extend in cantilever fashion rearwardly from the bosses F4—F5, respectively, and into the fruit handling zone Z of the machine. The inner or free ends of the rods 25—25' as best seen in Fig. 12 terminate short of the plane of movement of the fruit holding means H adjacent the spindle S. The guide rods 25—25' are parallel with the spindle S and are disposed to support a feed carriage F6 for reciprocation toward and from the spindle S.

Each feed carriage F6, as best shown in Figs. 3, 9, 10 and 12, comprises a flat bed F7 having bosses 28 and 28' on its under side adjacent its four corners. These bosses are bored to fit the respective guide rods 25—25', the fore and aft bosses 28 riding on guide rods 25 and the fore and aft bosses 28' riding on guide rod 25'. Means for effecting reciprocation of the feed carriages F6 upon the respective guide rods 25—25' comprises an angle iron spine 29 having one of its flanges disposed for sliding movement over the top surface of each flat bed F7. All six of the feed carriages F6 are joined for movement in unison in gang fashion by the common drive shown in Fig. 9. In this connection, the angle iron spine 29 has its respective ends secured to a casting or drive bar 30—30' (Figs. 3 and 9). Each drive bar 30—30' has a pair of bosses 30b formed thereon and bored to fit upon a guide rod 31—31' respectively. The guide rod 31 is secured to the left side of frame 1 above the angle iron 4 and the guide rod 31' is secured to the right side of the frame 1 above angle iron 3. The fore end of each guide rod 31—31' is secured to a boss 32 (Fig. 9) fixed to the fore tower 11 or 11', as the case may be. The aft end of each rod 31—31' is secured to a boss 33—33', respectively, bolted to the partition 15, Fig. 2. As best seen in Fig. 9, the aft end of each drive bar 30—30' has one end of a connecting rod 34—34' pivotally secured to it. The opposite end of each connecting rod 34—34' is pivotally connected to the free end of a rocker arm 35—35', respectively. The upper end of each rocker arm 35—35' is journaled for swinging movement on a pin $p$—$p'$ extending laterally from the upper end of the respective aft tower 12—12'.

Each rocker arm 35—35' is connected to one end of a rocker lever 36—36' by a link 36L—36L' respectively. Each lever 36—36' is mounted for rocking movement upon a common rocker shaft 37 suitably supported transversely within the frame 1 and above the common drive shaft 8 as best seen in Figs. 2 and 9. The rocker shaft 37 has secured to it a cam arm 37' which carries a roller 36R disposed in a track 38T formed in a cam 38 secured to the common drive shaft 8. The track of cam 38 is so configurated as to effect reciprocation of the two drive bars 30—30' so as to move the angle iron spine 29 of all of the feed carriages F6 toward and from the spindles once in each cycle of operation of the machine. While the spine 29 is spaced from the flat bed F7 it will be noted in Figs. 10, 12, 18 and 19 that these two elements (the spine 29 and the flat bed F7) are united for movement by the coupling mechanism A hereinbefore mentioned.

The coupling mechanism A consists of an arm A1 having one end fixedly secured to the spine 29 so as to extend rearwardly therefrom parallel to the guide rods 25—25' and above the bosses 28—28' at the left hand side of the flat bed F7. A lever arm A2 is pivotally secured as at A3 to the free end of the fixed arm A1. This lever arm A2 carries a lateral pin A4 disposed to engage behind a post A5 secured to the flat bed F7. The post A5 extends upwardly into the normal path of the lateral pin A4 so that when the spine 29 is moved toward the spindle S, the flat bed F7 is likewise moved in the same direction. Upon the return stroke of the spine 29 (away from the spindle) the spine 29 engages a lip F8 projecting upwardly from the fore edge of the carriage F6. In the foregoing manner, the carriage F6 is movable with the spine 29 yet can be uncoupled therefrom upon the inward (fruit feeding) stroke in a manner later to become apparent.

Each bracket F1, hereinbefore mentioned, has a pair of fruit receiving rails 39—39' extending rearwardly therefrom parallel to the guide rods 25—25' and slightly below an imaginary line extended rearwardly from the longitudinal axis of the spindle. These fruit receiving rods 39—39' are disposed close enough to each other to support the bulb end of a relatively small sized as well as a larger sized pear deposited thereon. The fore ends of rails 39—39' are secured to suitable bosses on the under side of the web portion F3 of bracket F1. The opposite ends of the rails 39—39' have no support and therefore a pear disposed thereon will not be obstructed against movement toward the spindle S. Each of these rails 39—39' is provided with a detent 40—40' respectively (see Figs. 10 and 11) so positioned along the rails as to receive and support the neck end of a pear while the bulb end of such pear rests upon the fruit receiving rails 39—39' to thereby support the pear with its stem-blossom axis in substantial alignment with the axis of the spindle S.

*Fruit orienting mechanism*

A fruit aligning cup in the form of a bell B is associated with the guide rails 39—39'. The bell B is normally disposed with its open bell shaped end adapted to engage the stem end of a pear as shown in Figs. 3, 10 and 12. This fruit aligning cup or bell B is formed on a web B1 extending downwardly between the guide rails 39—39' and having a lower end suitably secured to or formed integrally with the upper surface of the flat bed F7 of the feed carriage F6. The cup B is provided with cut outs 41—41' (Fig. 10) aligned with the detents 40—40' projecting up from rails 39—39' for permitting passage of the cup B along the same when the feed carriage is reciprocated in the manner as hereinbefore explained.

*Fruit receiving and semi-orienting mechanism*

The aforementioned fruit receiving mechanism R of each unit U is disposed to deposit an individual pear onto the respective fruit receiving rails 39—39' of the respective feed mechanism F. In this mechanism R several orienting cups R9 move in gang fashion with a U-shaped oscillating carriage R1 having a bight portion R2 secured to the outer ends of leg portions R3—R4. The opposite ends of legs R3—R4 are secured to the ends of a cross shaft R5 at the sides of the frame 1, see Figs. 1, 3 and 5. The cross shaft R5 is mounted in bearing bosses $b5$ secured to transverse angle iron 13' for allowing the U-shaped carriage R1 to oscillate between the full and dotted line positions indicated in Fig. 5. Also secured to the cross shaft R5 is an arm R5' the free end of which arm is pivotally connected to the upper end of a cam bar R6. The cam bar R6 is slotted as at R6' to fit the common drive shaft 8 and as at R6" to fit the rocker shaft 37 immediately above it. The lower end of cam bar R6 carries a roller R7 which extends into a track R7' formed in a cam wheel R8 secured to the common drive shaft 8.

From the foregoing it will be apparent that as the common drive shaft 8 is turned, the cam wheel R8 imparts up and down movement to the cam bar R6 to oscillate the U-shaped carriage R1 once in each cycle of operation of the machine. This oscillation of the carriage R1 occurs in about one-sixth of one cycle so that the cups R9 thereof remain in their upper or fruit receiving position for the greater part of each cycle of operation.

Referring now to Figs. 1 and 5 through 8, each fruit receiving and semi-orienting cup of the mechanism R comprises a cylindrical shaped shell or cup R9 having one side open at 42 diametrically opposite a mounting heel 43 formed on the exterior side of the shell. The heel 43 of each cup R9 is secured in any suitable manner, as for instance bolted, to the bight portion R2 of the carriage R1. The opening 42 is vertically above and in alignment with the extended axis of the spindle S in the unit U of which they are a part. The shell R9 is highest at the heel 43 and its upper edge tapers downwardly toward the side margins 42' of the opening 42 in the fore side of the shell. In this manner, there is a natural tendency for the stem end of the pear to glide toward the open side 42 of the cup.

Each cup R9 has a movable bottom 44 (Fig. 7) having a peripheral projection 45 to which a pin 46 is secured for turning movement therewith. This pin 46 is journaled in vertically spaced ears 47—47' formed on the outer side wall of the shell R9 (right side, Fig. 6). There is a tension spring 48 associated with the movable bottom 44 and one fixed ear 47 of the shell R9 for maintaining the bottom 44 in normally closed position relative to the otherwise open lower end of the cup R9.

The cup or shell R9 is of a diameter suitable to receive a large size pear, bulb end first as illustrated in Fig. 5, while the orienting cups are in extreme elevated position during dwell of the oscillating carriage R1 in its raised position. Since the carriage R1 is in raised position during most of each cycle of its operation, pears can be hand deposited into the several fruit receiving cups accurately and in a leisurely manner. Thus it will be a simple matter for an attendant to deposit six pears into the fruit receiving cups R9 during dwell in their upper position.

Semi-orienting

Means for effecting movement of the bottom 44 from closed to open position is best illustrated in Fig. 6. In this view it will be noted that a lever 49 is secured to the pin 46 to which the bottom 44 is connected. This lever 49 is normally disposed to extend laterally of the cylindrical cup R9 so that when the fruit receiving mechanism R is lowered into fruit depositing position, the lever 49 is disposed in the path of movement of an upstanding roller 50 which is carried by and movable with the spine 29 of the feed mechanism F. It should here be noted that the fruit receiving cup is lowered just as the feed mechanism F is in the last phase of its return stroke (away from the spindle). Consequently, when the cup or shell R9 dwells above the rails 39—39' the upstanding roller 50 engages the lever 49 to rock the bottom 44 from closed to open position relative to the shell R9. In this manner the fruit is free to drop from the cup onto the rails 39—39'.

Simultaneous with movement of the bottom 44 relative to the cup shell R9, the fruit is semi-oriented for deposit upon the rails 39—39' in proper position. As best seen in Figs. 1 and 7 the movable bottom 44 of the cup has an arcuate fore edge 51 adapted to register with arcuate inner wall of the shell R9 when the bottom 44 is swung into open position (dotted lines Fig. 7). Moreover, the arcuate fore edge 51 of the bottom 44 has an upturned lip 52 adapted, when the bottom is swung toward open position, to engage in the calix cavity of a pear (see Fig. 8), for rocking the pear in a direction to urge its stem end toward the opening 42 in the front side of the shell R9. Since the side walls of the shell taper toward the open side 42 thereof, the stem end of the pear is guided into a position in which the stem-blossom axis of the pear becomes congruent to the axis of the spindle S. Consequently, as the bottom 44 opens up to drop the pear onto the rails 39—39' the stem end of the pear is disposed to be received by the detents 40—40' on the fruit receiving rails 39—39'.

Moreover, the pear upon being thus deposited onto the fruit receiving rails 39—39' will be disposed with its bulb or calix end facing the spindle S and its stem end facing the bell B of the feed mechanism. The detents 40—40' are so disposed as to support the stem end of the pear in substantially horizontal alignment with the axis of the spindle as best shown in Fig. 10. Consequently, although the stem end of the pear may be slightly misaligned relative to the axis of the bell B, the open funnel mouth thereof functions to guide the stem end of the pear into absolute alignment therewith in the manner as illustrated in Fig. 12.

From the foregoing, it will be appreciated that irrespective of the angular disposition of the stem-blossom axis of the pear relative to the axis of the cylindrical shell R9, each fruit is automatically semi-oriented while being deposited onto the feed mechanism F. Final orientation and centering of the fruit relative to the spindle occurs simultaneous with advancement of the fruit toward the spindle in a manner now to be explained.

Final orienting and centering

Immediately following deposit of the pear into the feed mechanism, the fruit receiving mechanism is raised toward its normal position out of the path of the bell B of the feed mechanism. The bell B, when advanced toward the pear as seen in Fig. 10, picks up the stem end of the pear which becomes supported within bell B instead of on the detents 40—40'. The bulb end of the pear now glides along the parallel rails 39—39' and ultimately engages the flared walls of the fruit centering means "O."

The fruit centering means "O" comprises a pair of half funnels 53—53' having flared forward walls 54—54'. Each half funnel 53—53' is suspended upon a rod 55—55' having its upper end pivotally mounted on a shaft 56—56', and linked together as at 56a (Fig. 1) so that the rods move toward and from each other in unison. A spring 56b associated with the linked upper ends of rods 55—55' serve to normally urge the rods and the half funnels 53—53' carried thereby toward each other (toward dotted lines Fig. 13) so as to assure centering of the smallest as well as the largest pears.

In Figs. 13 and 14 it will be noted that the flared forward wall 54 or 54' of each half funnel 53 or 53' has an inwardly projecting ledge 57 adapted to receive and support the bulb end of the pear as it glides off the ends of the parallel rails 39—39'. These ledges 57 taper down to merge with the restricted portions of the half-funnels 53—53' so that the bulb end of each pear, no matter its diameter, will become centered with the fore end of the spindle S. As best seen in Fig. 12, the fore end of the spindle S is disposed to pierce the fruit as it emerges from between the half-funnels 53—53'. At the same time, the stem end of such pear is also being centered relative to the bell B of the feed mechanism. From the foregoing it will be apparent that the stem-blossom axis of each pear is axially aligned with the spindle S as the pear is being impaled upon the latter.

The movement of the pear from the position shown in Fig. 14 to that of Fig. 15 causes the entire stem fibres of the fruit to become lodged within the hollow center of the coring tube S4, the stem of the pear protruding from the fore end of the spindle as seen in Figs. 15 and 16.

It should here be noted that the fins f of the spindle S are disposed to register with the seed cell zone of the pear. This is possible by the fact that in all pears the center of the seed cell zone is substantially ⅞ of an inch from the calix end of the pear. This is more or less uniform and standard irrespective of the size of the pear, and as a result, a substantial if not actual registration of the seed cell zone with the fins f can be attained. However, since all pears are not of identical length it will be apparent that such registration of the fins with the seed cells would not occur if the fruit feeding bell B were to advance to the full end of its stroke with the feed bed F7 and spine 29. It is in this connection that the gauge means G comes into play to detect when the seed cells of a fruit are in register with the fins and to effect operation of the coupling mechanism A to stop further movement of the bell B with the feed bed F7.

Fruit gauging mechanism

Referring now more particularly to Figs. 12 and 14 through 18 it will be noted that the coring tube S4 extends sufficiently forwardly of the bushing S3 to receive a block G1 for sliding movement thereon. This block G1 carries a fruit engaging pad G2 the fore end of which circumscribes the blossom end trimming blades S5 on the coring tube S4 of the spindle. The fruit engaging pad G2 is adjustably secured to the block G1 so that the pad G2 can be disposed for engagement by the calix end of the pear just prior to registration of its seed cell zone with the fins f.

As best illustrated in Fig. 15, the block G1 of the gauging mechanism is linked to a trip mechanism G3 including a lever G4 having one end secured to a boss G5 and its opposite end loosely engaged in an enlarged opening G6 formed in a depending leg G7 of the block G1. The boss G5 is rockably supported on trunnion ears G8 extending from the partition 15. The trip mechanism G3 also includes an elongated arm G9 extending forwardly from the the boss G5 so that the free end G10 of arm G9 will be disposed beneath a pin A6 which extends laterally from the lever arm A2 which is pivotally secured to the inner end of the arm A1 of the coupling mechanism A. It should here be noted that the pin A6 is secured to the lever arm A2 and extends through an arcuate slot A7 formed in the arm A1 which is fixed to the spine 29 for movement therewith.

Referring to Fig. 15 it will be apparent that the gauge block G1 is normally urged forwardly relative to the spindle S by reason of the counterweighting effect of the trip lever G9. In this manner the fruit engaging pad G2 is disposed in advance of the blossom end trimming fins S5 to be engaged by the oncoming fruit. Now when the bell B moves the pear onto the spindle S by reason of the coupled relation of the feed bed F7 with the arm A1 secured to the spine 29, the pear is positively urged toward the fruit engaging pad G2. However, when the calix end of the pear touches the pad G2, continued movement of the pear causes the block G1 to slide back upon the spindle until the pear abuts the annular flange S6 at the base of the coring tube S4. Thus the trip mechanism G3 is rocked (counterclockwise Fig. 15) and since the laterally extending pin A6 is now above the free end G10 of lever arm G9, the lever arm A2 from which pin A6 extends is raised from dotted to full lines as shown in Fig. 18. In this manner the coupling A is rendered ineffective, i. e., the laterally extending pin A4 is raised above the post A5 carried by the feed bed F7. Thus the feed bed F7, and accordingly the bell B, ceases to move inwardly although the spine 29 and the arm A1 secured thereto continue on to their full stroke position. Thus the pear being fed onto the spindle ceases to move further inward and the seed cell zone of such pear will be in register with the fins f on the spindle. Moreover, the blossom end trimming fins S5 will be well embedded into the calix end of the pear and assist in coupling the fruit to the spindle for turning movement therewith.

The trip mechanism G3 is simultaneously latched in tripping position as best shown in Figs. 16 and 17. This latch L comprises a leaf spring L1 having one end secured to the partition 15 and its free end offset or hooked to receive a stud L2 extending laterally of the depending leg G7 beneath the block G1 of the gauging mechanism G. Thus, the fruit now remains on the spindle S without any backward pressure of the pad G2 against the fruit as would ordinarily be the case were the counterweighing effect of the trip mechanism to bear upon the gauge block G1. From the foregoing it will be seen that when the spindle begins to turn, the fruit is free to turn therewith by reason of the manner in which the fins f and S5 are embedded in the fruit. It will be noted in Fig. 16 that the stem end of the fruit has tangent contact with a revolvable portion B2 of the bell B. Consequently even though the bell B stands in bearing relation to the fruit to maintain the calix end of the fruit against the base flange S6 of the coring tube, the fruit will freely rotate with the spindle S.

Stem and calix trimming

The gauge block G1 (Fig. 16) carries a calix trimming knife 58, the sharpened end of which is disposed to carve a countersunk cavity into the calix end of the turning fruit during the first revolution thereof. Similarly, the stem end of the fruit is trimmed by a knife 59 which is secured to the free end of an arm B3 pivotally mounted as at B4 on the upstanding web B1 formed integrally with the flat feed bed F7. This arm B3 is normally urged anti-clockwise (Figs. 10 and 19) by a spring B5. In this manner the tip of the stem trimming knife 59 is normally held down within a slot B6 formed in the fixed flared mouth of the bell B. The lower edge of the arm B3 bears against a cam surface B7 formed on a leg B8 extending rearwardly from the spine 29 above the feed bed F7. This cam surface B7 has an acclivity B9 which engages beneath the arm B3 when the bell B becomes uncoupled relative to the feed mechanism at the coupling A in the manner as hereinbefore explained. Consequently, when the bell B ceases to move and feed bed F7 continues on to its full stroke position, the arm B3 is cammed upwardly against the action of its spring B5 (see also Fig. 19) to cause the knife 59 to assume the position shown in Fig. 16. It will therefore be apparent that upon the first revolution of the pear with the spindle, both the stem and calix ends of the fruit are trimmed.

Peeling

The peeling mechanism P, for purposes of the present invention, may be any one of a number of well known designs. For purposes of illustration there is shown in Fig. 22 a conventional peeling head P1, see also Figs. 1, 3, 12, 14 and 15, constructed to travel horizontally along one side of the turning pear, following the contour thereof from the trimmed calix end to the trimmed stem end of the fruit. The peeling head as best seen in Fig. 14 includes a razor thin blade or knife P2 which is convex so as to engage the periphery of the turning pear in a manner not to dig too deeply into the flesh or meat of the pear. In this manner only a thin ribbon like, tissue thin, layer of skin is removed from the pear as the peeling knife traverses the contour thereof. The knife P2 as best seen in Fig. 22 is suspended on an arm P21 pivoted as at P22, its upper end, to a lug extending from a gear P23. The gear P23 is suitably supported on a movable carriage P3 to engage a rack P31 fixed to the frame 1 (see Fig. 1) so that as the carriage is moved forward, the gear, arm, and knife are turned relatively to the pear. The arm P21 upon which the knife is carried is normally urged in a direction toward the pear by a spring P24 (Fig. 1) so that the knife bears lightly against the periphery of the pear but with sufficient force to assure continued and perfect peeling of the turning fruit.

The carriage P3 of each peeling mechanism is secured to transverse angle iron P4 having its ends secured to parallel rods P5 at either side of the machine frame 1. The rods P5 are journaled for horizontal reciprocation forward and backward, once in each cycle of operation of the machine. To this end, each rod P5 has operative connection with a lever arm P6, Figs. 1 and 2, having their opposite ends secured to the rocker shaft 10 hereinbefore mentioned. Also secured to rocker shaft 10 is a cam arm P7 having a cam roller P7' at its free end riding within a cam track P8' in a cam wheel P8 secured to the main drive shaft 8 for rotation therewith. In this manner the peeling head P1 traverses horizontally the contour of the pear from calix to stem end of the fruit, it being understood that the bell B will have begun to withdraw from the fruit by return operation of the feed mechanism prior to the arrival of the peeling knife at the extreme stem end of the trimmed fruit.

Pear holding—seed celling—pear halving

Simultaneous with the completion of the peeling operation aforesaid, the spindle S ceases to turn due to the roll C9 of the clutch mechanism C riding onto the detent d2 on the periphery of the cam C8 (see Figs. 20–21). During this dwell of the spindle with the peeled fruit thereon, the fruit holding mechanism H comes into play. As hereinbefore indicated, both the knives K as well as the fruit embracing jaws J are involved in holding the fruit.

*Fruit embracing jaws J.*—Referring now to Figs. 24, 25 and 27, the fruit embracing jaws J comprise a pair of fruit engaging pads each of which consists of angularly disposed fingers J1—J1' disposed to receive the bulb portion of the pear between them, see also Fig. 12. The angle between the fingers J1—J1' is such as to tangentially engage the periphery of the largest as well as the smallest pears fed into the machine. The fingers J1—J1' converge at a corner boss formation which is bored to fit upon a rod J2 extending forwardly from the free lower end of an arm J3—J3' having its upper end secured to a shaft J4 for rocking movement therewith, see Figs. 24 and 25. Each arm J3 is on a separate shaft J4 and each such shaft is journaled in a bearing $b7$ in turn secured to the partition 15. Both arms J3 are linked together by a yoke and pin arrangement J5 so that the arms will move in unison toward and from each other. A torsion spring J6 anchored to the shaft J4 of the arm J3 tends to urge the arms J3—J3' toward each other and to yield when the arms are urged apart in a manner now to be explained.

Inasmuch as both arms J3 of each unit are linked together, only one shaft J4 need be operated by the drive mechanism H1 for holding the means H. Consequently a lever H2 is secured to one shaft J4 so as to extend into the path of a lateral tine H3 carried by a rod H4 mounted in suitable bearings $b8$ (Fig. 3) for reciprocation transversely of the frame and behind the partition 15. This reciprocable rod H4 has pivotal connection as at H5 with the upper end of a rocker arm H6. The rocker arm H6 is mounted for rocking movement midway its ends on a stud shaft H7 supported by a bracket secured to the lower angle iron 14' hereinbefore mentioned. The lower end of rocker arm H6 carries a roller H6' having engagement with a cam wheel H8 secured to the common drive shaft 8. The spring J6 by which the arms J3 are urged toward each other serves to maintain the lever H2 against the lateral tine H3 on reciprocable rod H4 and thus the additive effect of the springs J6 of all units U function to maintain the cam roller H6' on rocker arm H6 in constant engagement with the camming surface of the cam wheel H8.

From the foregoing it will be apparent that immediately following the peeling operation, the arms J3 of the jaw portion of the holding means H are urged together to grip the bulb portion of the fruit between the fingers J1—J1'. Simultaneously therewith, the knives K also enter the fruit but only partially in a manner now to become apparent.

*Pear halving knives K.*—The operation of the knives K is illustrated best in Fig. 26, their disposition in the machine and relative to the fruit being disclosed also in Figs. 3, 13, 14, 15 and 27. There are two knife blades K1 and K1' for each unit U and each such knife is disposed with its blade in a vertical plane coincident to the axis of the spindle S, see Figs. 13 and 27. The cutting edge K2—K2' of each knife blade faces the coring tube portion of the spindle and is ground to a contour corresponding to the shape of the coring tube S4 including that of the fins $f$ as well as the triangular fins S5 disposed to trim the blossom end of the fruit. The contour of the cutting edge of each blade is such as to completely sever the pear into two identical halves similar to those illustrated in the lower right hand portion of Fig. 3.

Each lower and upper blade K1—K1', respectively, of the fruit halving knife K has an edge opposite its cutting edge secured to the end of an arm K3—K3', respectively. These arms K3—K3' are suitably secured to upper and lower spaced shafts K4—K4' for rocking movement therewith, the upper shaft K4 being a sleeve journaled on the cross shaft R5 of the fruit receiving and orienting mechanism. These shafts K4 and K4' extend transversely of the frame 1 and are suitably supported thereon behind the partition 15. It will thus be seen that the arms K3—K3' extend through suitable slots 15$k$—15$k'$ provided in the partition 15 so that the major portion of the arms K3—K3' as well as the knives carried thereby are in the fruit handling zone Z of the machine. The spaced shafts K4 and K4' are united for oscillating movement by meshing gear segments K5 and K5' so as to rock the arms K3—K3' and their knife blades toward and from each other in unison. One of the gear segments K5 has an arm K6 secured thereto for oscillating movement therewith relative to its shaft K4. This arm K6 has a cam roller K7 at its free end disposed in a cam track K7' formed in a cam wheel K8 secured to the main drive shaft 8.

As best illustrated in Fig. 26, the operation of the knives K1 and K1' is such that they enter the fruit only partially during dwelling of the spindle S as effected by the acclivity $d2$ (Fig. 20) of the clutch mechanism C. In other words, the knife blades K1—K1' dwell at partial stroke (illustrated by dot-dash lines Fig. 26) during spinning of the spindle S as effected by movement of cam roller C9 between the acclivities $d2$ and $d1$ of the clutch cam wheel C8. Simultaneous with entry of the knives K1—K1' into the fruit as aforesaid, the bulb portion of the pear is engaged by the angularly disposed fingers J1—J1' of the fruit embracing jaws J. In this manner the jaws J and knives K function as a fruit holding means H and thereby cooperate to firmly hold the fruit, when the spindle S again turns, to resist movement of the fruit with the spindle during the seed celling operation in accordance with the present invention.

*Seed celling.*—As hereinbefore mentioned, the fins $f$ by which the fruit is coupled to the spindles S for turning therewith during peeling of the fruit also function to cut the seed cells from the fruit. In this connection, each fin $f$ is of semi-circular shape (Figs. 12, 14 and 16) there being a plurality of them radially disposed about the spindle with their arcuate outer edges adapted to be disposed within a sphere comparable to the seed cell zone of a pear or like fruit.

As before explained, the seed cell zone of the fruit will be in register with the orbital sphere within which the several fins $f$ are confined. Consequently, as the spindle turns while the fruit is being held by the fruit holding means H, the fins $f$ act as reamers to break the wedges of fruit pulp between them from the remaining body of the fruit surrounding the seed cell zone thereof. Simultaneously therewith the triangular fins S5 also act to cut away a countersunk cavity in the fruit in the region of the blossom end thereof. In this manner the seed and fibres confined within the seed cell zone of the fruit are severed from the main body of the fruit although the latter is still whole and in one integral piece. While all fins $f$ may well be of the same radial dimension relative to the axis of the spindle, it has proven preferable that at least one of these fins $f1$ be of slightly greater radius than the others so that its arcuate edge will extent slightly beyond the orbit in which the other fins move. In this manner the larger fin $f1$ extends sufficiently beyond the seed cell zone of the fruit and into fruit pulp to scrape a clean, bowl like, cavity in the fruit.

It should here be pointed out that the fingers J1—J1' of the fruit holding jaws J bear sufficiently against the outer periphery of the bulb portion of the pear to counteract any tendency of splitting thereof due to the movement of the fins $f$ and $f1$ within the fruit. Meantime the knife blades K1 and K1' which are partially embedded in the fruit serve to firmly resist turning of the fruit under the influence of the movement of the fins $f$ within the fruit. Consequently, upon complete rotation of the spindle S at least one revolution and preferably more, the seed cells are completely severed from the fruit being held by the holding means H.

*Pear severing or halving.*—Immediately following severance of the seed cells from the fruit the spindle S ceases to rotate by action of the acclivity $d1$ relative to the clutch C, the pear embracing jaws withdraw from engagement with the fruit, and simultaneously therewith, the knife blades K1 and K1' resume movement toward the spindle S in the manner as illustrated in Fig. 26. Thus the cutting edges K2 and K2' of the knives shear the fruit meat through to the coring tube S4, and the seed cell cavity now formed in the fruit as well as the countersunk recess at the blossom end of the fruit.

In most instances the complete stroke of the knife blades K1—K1' under the foregoing situation severs the fruit into two perfect halves which easily fall by gravity away from the coring tube and the closed blades K1—K1'. Oft times, however, the severed halves of the fruit might continue to cling to the closed blades K1—K1' due to the vacuum created by the juice exuding from the fruit. In that event, the means V associated with the uppermost knife blade K1' tends to urge the severed halves of fruit downwardly and apart for free gravitation away from the spindle and blades.

The means V, as best seen in Figs. 3, 13, 14, 15 and 27, comprises a wedge shaped lever V1 split lengthwise to straddle the blade K1' to provide half wedges V2—V2' on either side of the blade. The opposite end of the lever V1 has an integral yoke V3 having a pair of ears V3' through which a pin V4 extends. This pin V4 has its mid portion supported in a boss V5 depending from a block V5' secured to the arm K3' upon which the uppermost blade K1' is supported. The pin V4 is secured by a set screw V4' to the boss V5 and one end of the pin V4 has a coil spring V6 thereon, the ends of this spring being anchored, one to the pin V4 and the other on the lever V1. In this manner the lever V1 is urged in a direction to cause its half wedge ends V2—V2' to bear against the fruit being severed by the knife blades K1—K1'. The tension of the coil spring V6 is adjustable by turning the pin V4 relative to the boss V5, subject to release and tightening of the set screw V4'. In this manner the force with which the half wedges V2—V2' bear against the fruit is such that they will not mar the fruit and that they will yield relative to the fruit while its halves are still integrally connected. However, as soon as the fruit is completely severed by action of the knife blades K1—K1', the tension of the spring V6 is such as to overcome any adherence of the fruit halves to the blades.

From the foregoing it will be apparent that the wedge halves V2—V2' while being urged downwardly relative to the knife blade K1' will tend to enter between the half fruit and the blade K1'. Should the pear cling to the blade K1' with any appreciable resistance over the normal tension of the spring V6, it will be noted in Figs. 3 and 15 that a stud bolt V7, extending up through a bracket V8 on the partition 15, is adapted to be engaged by a pad V9 formed as a part of the yoke V3. In this manner, after the uppermost knife passes its fruit holding dwell (dot-dash position Fig. 26), the pad V9 can engage the stud bolt V7 to positively urge the lever V1 toward the fruit clinging to the blade K1', to assure removal of the fruit therefrom in the manner aforesaid.

Refer now to Fig. 17 wherein the arm K3 for the lowermost knife blade K1 is shown in relation to the spindle S. This arm K3 carries a casting 60 having a downturned forwardly extending lip 61 to which the discharge chute N is attached. This chute N is disposed below the position in which the pear is stationed during the peeling, seed celling and severing operation hereinbefore explained. It will thus be apparent that as the severed halves of fruit fall away from the spindle, they drop onto the downwardly pitched chutes N for deflection thereby onto a discharge conveyor illustrated in Fig. 3. It should be kept in mind that the knives K are opened up immediately following severance of the fruit into halves. Thus as the lower knife K1 is swung down with its arm K3 the discharge chutes N are likewise inclined at a greater angle forwardly to assure discharge of the fruit halves onto the conveyor belt below, see Fig. 3.

Incident to the foregoing movement of the lowermost knife K toward and from the spindle during each cycle of operation of the machine the latch means L, hereinbefore referred to, is released. This latch L, Fig. 17, is the means by which the trip mechanism G3 is secured in feed carriage uncoupling condition during impalement of a fruit onto the spindle by the advance of bell B. The arrangement is such that the latch L is uneffected by the upward stroke of the lower knife K1 and its arm K3. However, when the arm K3 lowers toward open position (full lines Fig. 17) the stud pin L2 is cammed forwardly from beneath the offset or hooked free end of the leaf spring L1. In this manner the trip mechanism G3 is now free to return to its normal position by the counterweighting effect of the trip lever G9. By this time the spine 29 of the feed mechanism F will have returned sufficiently toward normal position so that the lateral pin A4 on the coupling arm A2 will fall upon or to the forward side of the coupling post A5 secured to the flat bed F7 preparatory to the next fruit feeding operation. It should be noted that the upper surface of the post A5 is of inclined shape so as to act as a cam for raising the laterally extending pin A4 on arm A2 of the coupling A as they move toward reset position with the spine 29.

The means for releasing the latch mechanism L upon the down stroke or return movement of the lower knife arm K3 comprises a one-way counter-weighted finger L3 pivotally mounted as at L4 on the upper end of an arm L5 formed integrally with the casting 60 which is secured to the knife arm K3. As best seen in Fig. 17 this finger L3 has a nose portion L6 which extends from the arm L5 to travel in an arcuate path with the knife arm K3 for abutment with the stud L2 when it is in latched position beneath the hooked end of the leaf spring L1. The counterweighted end L7 of finger L3 engages a stop pin L8 extending from the arm L5 in such a manner that the finger L3 will rock counterclockwise, Fig. 17, upon engagement of the nose L6 with the stud L2 during upward movement of the knife arm K3. However, upon downward movement of the knife arm K3 the finger L3 is held in extended position due to its counterweighted end L7 engaging the stop pin L8. Consequently, the nose L6 of the finger L3 acts as a cam upon downward movement of the knife arm K3 to thereby cam the stud pin L2 from beneath the hooked end of the leaf spring L1. In this manner the gauge block G1 is urged forwardly relative to the spindle S to again position the fruit engaging pad G2 in advance of the blossom trimming fins S5 (as seen in Fig. 3). Thus the gauge mechanism G is reset and ready to detect the positioning of the next pear upon the spindle with the fins f in register with the seed cell zone of such pear.

The return stroke of the feed carriage including the spine 29 causes the trimmed stem end of the fruit to be stripped off of the spindle as the knife 59, which is still raised, is withdrawn therefrom with the bell B. Thus one complete cycle of operation of the machine is accomplished and the fruit receiving cups R9 which have now received fruit are ready to come down to deposit the same into the feed mechanism. Having thus described the machine in detail a resume of its operation will now be given in summary.

*Operation*

The machine is set into operation by supplying electrical current to the motor X whereupon the common drive shaft 8 is turned for effecting operation of all of the various sub-assemblies in the machine. The attendant stands at the fore end of the machine facing the fruit receiving cups R9 for depositing one fruit into each cup in the manner illustrated in Fig. 5 while the fruit receiving mechanism R is in raised position. It will be noted from the shape of the cam track R7' in Fig. 5 that the cups R9 are held in raised position for more than three quarters of the time it takes the machine to complete one cycle of its operation. This gives the attendant sufficient time to deposit a fruit into each cup R9 while previously fed fruit are being processed in the machine.

The carriage R1 is operated in timed relation to lower the cups R9 toward the fruit supporting rails 39—39' as the flat bed F7 and bell B are clearing the detents 40—40' on the rails 39—39'. As the lower end of cups R9 arrive in parallelism with the rails 39—39' (Figs. 6 and 8) the rollers 50 movable with the feed mechanism open the gate-like bottoms 44 of the several cups R9 to turn each fruit, stem end forward while releasing the fruit for discharge onto the fruit receiving and supporting rails 39—39'. The stem end of the fruit thus glides down one or the other tapered side margin 42' of the cup R9 for passage through the open side 42 thereof so that each fruit lands on the rails 39—39' with its bulb portion supported on the rails and the stem portion of the fruit supported on the detents 40—40', see now Figs. 10 and 11. By this time the bell B of the feed mechanism F will have reached fully retracted position. Before the beginning of the fruit advancing stroke, of the bell B, the carriage R1 and the fruit receiving cups R9 will rise out of the way of the oncoming feed carriage. Thus the levers 49 of the several gate bottoms 44 disengage the rollers 50 on the feed carriage and the bottoms 44 of the cups R9 will return to closed position by action of their springs 48.

From the foregoing it will be clear that the pear deposited onto each of the several units U will be disposed with its stem to blossom axis in substantial alignment with the axis of the spindle S, the calyx end of the fruit facing the spindle and the stem end of the fruit facing the open side of the bell B on the feed carriage (see Figs. 10 and 12). Now, as the bell B advances toward the spindle, the stem end of the pear is engaged by the flared mouth of the bell B, the axis of which is coaxial with the axis of the spindle. In this manner the stem portion of the pear becomes aligned with the axis of the spindle as the bulb portion of the pear glides along the rails 39—39' toward the spindle.

As the bulb portion of the pear rides off the extreme ends of the rails 39—39' it engages and becomes supported by the inwardly projecting ledges 57—57' on the half funnels 53—53', respectively, of the fruit centering mechanism "O" (Figs. 12 and 14). The bulb portion of the pear then rides up these ledges 57—57' which taper toward the restricted portion of the half funnels 53—53'. The half funnels 53—53' are normally close to the axis of the spindle so as to engage even the smallest pear fed into the machine. These half funnels 53—53' are disposed substantially coaxial with the spindle as best seen in Fig. 13 and therefore center the calyx end of the pear with the spindle. Since the stem end of the pear is centered by the bell B and the bulb end of such pear is centered by the half-funnels 53—53', it will be apparent that the stem to blossom axis of the fruit is now coaxial with the spindle. The extreme fore end of the spindle being disposed just behind the fruit centering half funnels 53—53' (see Fig. 12) the calyx end of the fruit becomes impaled upon the spindle while the bulb portion of the fruit is still guided by the restricted portion of the half funnels.

In connection with the foregoing, it should be noted that each feed carriage F6 carries a rearwardly extending arm 67 (Figs. 10, 12 and 13) the extreme cam end 68 of which is bent inwardly, i. e., toward the axis of the spindle but below it. This cam 68 is adapted to engage a roller 69 suspended from the lower end of the right hand half funnel 53' for urging the latter away from its normal position close to the axis of the spindle. Thus the half funnels 53—53' are always positively urged away from each other as soon as a pear is engaged by and becomes impaled upon the fore end of the spindle. As a matter of fact, the half funnels 53—53' will be urged apart by the cam 68 even though no pear is being advanced toward the spindle by the feed mechanism. In either event, the half funnels 53—53' are spread apart sufficiently to admit the bell B between them without danger of the inner surfaces of the half funnels becoming marred or scratched by the bell B.

The calyx end of the fruit being thus initially impaled upon the fore end of the spindle, the balance of the stroke of the bell B assures impalement of the entire pear coaxially of and on the spindle. Thus the pear arrives at the position shown in Fig. 15 between the knives K1 and K1' while they are in fully opened position. The core of the fruit is severed from the fruit simultaneous with advancement of the fruit onto the spindle. Thus the core fibres of the fruit become confined completely within the tube S4, the stem of the fruit extending from the fore end of the spindle as best seen in Figs. 15 and 16.

It should here be noted that the spine portion 29 of the feed mechanism is fully reciprocated between retracted position and extreme inward position once in each cycle of operation of the machine. It will therefore be seen that the bell B in the feed carriage F6 is adapted to be moved accordingly between such extreme inward and retracted positions of the spine portion of the feed mechanism. This full reciprocation of the bell B would be satisfactory so far as the smallest pairs are concerned but obviously any larger pears would become crushed between the bell B and the base end or flange S6 of the spindle. Consequently, advancement of the bell B is stayed or caused to cease as soon as the calyx end of the pear engages the base flange S6 regardless of the fact that the spine portion of the feed mechanism continues to advance to its extreme inward position. This staying of advancement of the bell B is brought about through engagement of the fruit with the fruit engaging pad G2 of the gauge mechanism G, the resultant operation of the trip mechanism G3 by which the coupling mechanism A is uncoupled to disengage the feed carriage F6 from the spine portion 29 of the feed mechanism F.

From the foregoing it will be seen that advancement of the bell B toward the base of the spindle ceases at various positions relative thereto dependent upon the size, i. e., the lengthwise dimension of the fruit being fed onto the spindle. Moreover, since the fruit engaging pad G2 of the gauging mechanism is spaced from the fins f on the spindle a distance determined by the average distance between the calyx end and seed cell zone of the fruit, namely, approximately ⅞ of an inch, it will be apparent that the fins f—f will be in substantial, if not actual, registration with the seed cell zone of the fruit when advancement of the bell B is stayed as aforesaid. Furthermore, the blossom end trimming fins S5 are also disposed along the spindle S between the fins f and the fruit engaging pad G2 in a position to assist in turning the fruit and for subsequently cutting a countersunk cavity in the calyx end of the fruit.

Simultaneous with advancement of the fruit into engagement with the gauging mechanism G the extreme end of the calyx trimming knife 58 carried thereby becomes embedded into the calyx end of the fruit, as best illustrated in Fig. 16. In addition to the foregoing, continued advancement of the spine portion 29 of the feed mechanism relative to the feed carriage F6 thereof causes the cam B9 on the spine 29 to elevate the stem end trimming knife 59 as illustrated in Fig. 19. The parts are now disposed in the position shown in Fig. 16 incident to turning of the spindle S due to shifting of the clutch C into operating position by the clutch cam C8.

The fins f being confined within the seed cell zone of the fruit which is more firm than the other portions of the fruit, when the spindle is turned the fruit also turns. Since the fins f have a slight forward tilt, i. e., in the direction in which they turn, it will be apparent that a wedge of fruit becomes lodged between adjacent fins. This wedge, as best seen in Figs. 11 and 27, is of an acute angle and so disposed as to prevent slippage of the fruit pulp from between adjacent fins to thereby assure turning of the fruit with the spindle. The triangular fins S5 at the base of the spindle also assist in turning the fruit with the spindle.

The first revolution of the spindle S causes the stem and calyx ends of the fruit to be completely severed from the main body of the fruit by the stationary disposition of the knives 59 and 58 relative to the spindle. Meanwhile the peeling head P is caused to travel along the pear longitudinally thereof from bulb to stem end of the fruit so that the peeling knife P2 removes the skin layer in a circumferential direction relative to the fruit.

By the time the peeling head reaches the trimmed stem end of the fruit, the feed carriage, bell B and spine 29 will have begun to withdraw from the spindle for return movement toward the fore end of the machine. The core ejector will then function to remove the stem core fibres from within the spindle while the fruit is still thereon and despite rotation of the spindle. After completion of the peeling operation the spindle ceases to turn by reason of the cam roller C9 engaging the acclivity $d2$ on the clutch cam C8. Thus the spindle dwells for a lapse of time sufficient to allow the knives K1—K1' to enter the fruit but partially. Simultaneous with partial movement of the knives K1—K1' into fruit holding position as illustrated in Fig. 26, the fruit embracing jaws J1—J1' engage the bulb portion of the peeled pear, Fig. 27. The pads of the jaws J1—J1' engage the fruit in a region thereof radially relative to the seed cell zone of the fruit so as to lightly but firmly embrace the fruit incident to turning of the spindle. The spindle then commences turning by reason of the removal of the cam acclivity $d2$ from engagement with the clutch cam C9.

The fruit is now restrained from turning with the spindle and the fins $f$ as well as the triangular fins S5 will effect a reaming action relative to the fruit. Since the disposition of the fruit on the spindle has been determined by gauge mechanism G it will be apparent that the seed cell zone of the fruit will be severed from the fruit by action of the fins $f$. One of the fins $f1$ being slightly larger than the others (in radial dimension) the cavity cut by the several fins $f$ will be scraped clean. Moreover, the slight forward tilt of the fins $f$ in the direction in which they move keeps or confines all of the seed cells and pulp within the orbit of movement of the fins, i. e., the seed cell zone of the fruit. This feature serves to prevent undue spreading or packing of the seed cell fibres and pulp radially outwardly from the seed cell zone and accordingly minimizes the possibility of splitting of the fruit. In this connection, the force with which the jaws J1—J1' embrace the bulb portion of the fruit also serves to overcome and/or minimize splitting of the fruit during turning and reaming action of the fins $f$ relative thereto.

Simultaneous with the foregoing seed celling operation, the triangular fins S5 ream a countersunk recess into the calyx end of the fruit and the pulp between the radially disposed fins S5 moves therewith relative to the fruit which is relatively stationary. After only a relatively few revolutions of the spindle relative to the fruit to accomplish the foregoing seed celling and calyx end trimming operations, the spindle ceases turning. This occurs when the cam roller C9 rides up onto the acclivity $d1$ of the clutch cam C8. This is the initial or starting position insofar as operation of the spindle is concerned, the spindle remaining stationary or in dwell until the next fruit is impaled thereon.

The final stage of the cycle of operation explained above consists of the completing of the stroke of the knives K1—K1' from fruit holding to fruit severing position as illustrated in Fig. 26. In this manner the peeled, trimmed and seed celled fruit is finally severed into two symmetrical halves at either side of the spindle so that the halves of the fruit are now released from the spindle.

Simultaneous with the final stroke of the knives K1—K1' into fruit halving position the fruit embracing jaws J1—J1' are withdrawn so that the halves of fruit are free to drop by gravity from the spindle. Since there is a likelihood that the fruit halves might cling to the knife blades K1—K1' due to suction, the wedge V carried by the upper knife K1' functions to bear down upon the upper extremities of the fruit halves. The means V is the half wedges V2—V2' each disposed with one face thereof parallel to the blade K1' and with the other face of such half wedge oblique relative to the blade for engaging the fruit substantially at the line of severance thereof. The spring urged wedges thus offer a downward thrust against the fruit halves and also tend to drive the half wedges between the fruit halves and the blade K1'. In this manner the fruit halves are positively urged away from the fruit halving knives.

The fruit halves falling from the spindle drop onto chutes N which are temporarily in raised position along with the lower knife K1. However, as soon as the knives K1—K1' are actuated to withdraw from the spindle, the chutes N are inclined sufficiently to cause the fruit halves to slide downwardly onto the conveyor belt below, see Fig. 3.

With the advent of withdrawal of the lower knife blade K1 from the spindle, dotted to full lines Fig. 17, the one way dog or finger L3 urges the stud L2 out of engagement with the leaf spring L1. Thus the gauge mechanism, which was previously latched out of fruit gauging position, is released for return toward fruit gauging position, dotted lines Fig. 17 or full lines Fig. 14. By this time the feed carriage F6 will have withdrawn sufficiently toward initial or fruit receiving position to dispose the pin A6 of the coupling mechanism A forwardly of the free end G10 of the arm G9 of the gauging mechanism. Thus the counter-weighting effect of the arm G9 assures return of the fruit gauging mechanism, especially pad G2 thereof, into fruit gauging position.

During the latter phases of the foregoing cycle of operation the next fruit fed into the fruit receiving cups R9 by the attendant will have been deposited onto the fruit receiving and supporting rails 39—39', in the same manner as heretofore explained incident to the next stroke of the feed mechanism.

While the structure herein has been specifically described it will be apparent that the details thereof can be modified, altered or varied in many respects without departing from the spirit of the invention herein disclosed and exemplified. We therefore desire to avail ourselves of all modifications, alterations and/or variations as fairly come within the purview of the appended claims.

What we claim and desire to protect by Letters Patent is:

1. In a machine for preparing a fruit having seed cells substantially uniformly spaced from its butt end, which machine includes a fruit supporting and coring spindle having a plurality of fins thereon confined within a space comparable to the seed cell zone of such fruit for turning the fruit with said spindle, the combination therewith of means for trimming, seed celling and halving the fruit while on said spindle comprising a fruit receiving means disposed parallel to said spindle and in advance thereof for supporting a fruit with its stem-blossom axis substantially coaxial with said spindle and with its butt end facing said spindle, means for advancing said fruit receiving means toward said spindle including a fruit engaging cup, a reciprocating feed carriage and means for coupling said carriage and cup for advancing the latter and the fruit engaged thereby toward and onto said spindle, gauge means adjacent the base of said spindle adapted to be engaged by the butt end of the fruit advanced thereonto by said fruit receiving means for gauging the butt end of the fruit relative to said fins and to register the seed cells of the fruit therewith, trip mechanism operatively connecting said gauging means and said coupling means for uncoupling said carriage from said cup upon engagement of said gauging means by the fruit to thereby stay advancement of said cup irrespective of continued movement of said carriage toward said spindle, a normally retracted stem trimming blade mounted on said cup for movement therewith, means on said carriage engageable by said retractable stem trimming blade for urging the latter into the fruit upon continued advancement of said carriage relative to said cup to thereby trim the stem end from the fruit as it turns with said spindle, fruit engaging means oscillating toward and from said spindle for engaging the fruit once in each cycle of operation for resisting turning of the fruit with said spindle whereby rotation of said fins relative to said fruit severs the seed cells from the fruit, and a pair of knives operated in timed relation with said reciprocating feed carriage for movement toward and from said spindle in a plane coincident with the axis of said spindle once in each cycle of operation for severing the fruit thereon into halves.

2. In a machine for preparing a fruit having seed cells substantially uniformly spaced from its butt end, which machine includes a peeling means and a fruit supporting and coring spindle having a plurality of arcuate fins thereon confined within a space comparable to the seed cell zone of such fruit for turning the fruit with said spindle during peeling of the fruit by said peeling means, the combination therewith of means for trimming, seed celling and halving the fruit while on said spindle comprising fruit supporting means in advance of said spindle for supporting a fruit with its stem-blossom axis substantially coaxial with said spindle, oscillating fruit receiving means for receiving a fruit fed into the machine and for positioning said fruit on said fruit supporting means with the butt end of the fruit facing said spindle, a reciprocating feed carriage arranged for reciprocation toward and from said spindle, a feed cup mounted on said feed carriage for free sliding movement in the direction of reciprocation thereof, means for coupling said carriage and cup for advancing the latter to engage the fruit on said supporting means for impaling the fruit onto said spindle, gauge means adjacent the base of said spindle adapted to be engaged by the butt end of the fruit being impaled for gauging the butt end of the fruit relative to said fins to thereby register the seed cells of the fruit with said fins, trip mechanism operatively connecting said gauging means and said coupling means for uncoupling said carriage from said cup upon engagement of said gauging means by the fruit to thereby stay advancement of said cup irrespective of continued movement of said carriage in the direction of said spindle, a normally retracted stem trimming blade mounted on said cup for movement therewith, means on said carriage engageable by said stem trimming blade for urging the latter into the fruit upon continued advancement of said carriage relative to said cup and fruit to thereby trim the stem end from the fruit as it turns with said spindle during peeling of the fruit, fruit gripping means for momentarily engaging the fruit subsequent to the peeling thereof for resisting turning of the fruit with said spindle whereby said fins turn relative to said fruit for severing the seed cells from the fruit, a pair of knives operated in timed relation with said reciprocating carriage for movement toward and from said spindle in a plane coincident with the axis of said spindle during dwelling thereof once in each cycle of operation for severing the fruit thereon into halves, and means for urging said half fruit away from said spindle.

3. In a machine for preparing a fruit having seed cells substantially uniformly spaced from its butt end, which machine includes a peeling means and a fruit supporting and coring spindle having a plurality of arcuate fins thereon confined within a space comparable to the seed cell zone of such fruit for turning the fruit with said spindle during peeling of the fruit by said peeling means, the combination therewith of means for seed celling and halving the fruit while on said spindle comprising fruit supporting means in advance of said spindle for supporting a fruit with its stem-blossom axis substantially coaxial with said spindle and with its butt end facing said spindle, a reciprocating feed carriage arranged for reciprocation toward and from said spindle, a feed cup mounted on said feed carriage for free sliding movement in the direction of reciprocation thereof, means for coupling said carriage and cup for advancing the latter to engage the fruit on said fruit supporting means for impaling the fruit onto said spindle, gauge means adjacent the base of said spindle adapted to be engaged by the butt end of the fruit being advanced thereonto for gauging the butt end of the fruit relative to said fins and register the seed cells of the fruit therewith, trip mechanism operatively connecting said gauging means and said coupling means for uncoupling said carriage from said cup upon engagement of said gauging means by the fruit to thereby stay advancement of said cup irrespective of continued movement of said feed carriage toward said spindle, fruit gripping means oscillating toward and from said spindle once in each cycle of operation of said feed carriage for engaging the fruit subsequent to the peeling thereof for resisting turning of the fruit with said spindle whereby rotation of said fins relative to said fruit severs the seed cells from the fruit, and a pair of knives operating in timed relation with said reciprocating feed carriage for movement toward and from said spindle in a plane coincident with the axis of said spindle once in each cycle of operation for severing the fruit thereon into halves.

4. In a machine for preparing a fruit having a seed cell zone substantially uniformly spaced a predetermined distance from the butt end thereof, which machine includes a peeling means and a fruit supporting spindle for turning the fruit during peeling of the fruit by said peeling means, the combination therewith of means for severing the seed cells from a fruit while it is on said spindle comprising a plurality of radially extending fins on said spindle confined substantially within a space comparable to the seed cell zone of said fruit, stop means at the base of said spindle for engaging the butt end of a fruit and spaced from said fins a distance comparable to said predetermined distance between the seed cell zone and the butt end of a fruit for gauging the butt end of said fruit relative to said fins to thereby register said fins with the seed cell zone of said fruit, and fruit engaging means oscillating toward and from said spindle for intermittently engaging said fruit for resisting turning thereof with said spindle and fins whereby said fins sever the seed cells from said fruit.

5. In a machine for preparing a fruit having a seed cell zone substantially uniformly spaced from the butt end thereof, which machine includes a peeling means and a fruit supporting spindle having a plurality of radially extending fins thereon for turning the fruit with the spindle during peeling of the fruit by said peeling means, the combination therewith of means for severing the seed cells from a fruit while it is on said spindle comprising an arcuate outer edge on each of said fruit turning fins, the said arcuate outer edges on all of said fins being confined within a space comparable to that in which the seed cell zone of said fruit is confined, means at the base of said spindle for engaging the butt end of a fruit for gauging the butt end of said fruit relative to said fins to thereby register said fins with the seed cell zone of said fruit, and fruit engaging means intermittently oscillating toward and from said spindle for engaging said fruit for resisting turning thereof with said spindle and fins whereby said fins sever the seed cells from said fruit.

6. In a machine for preparing a fruit having a seed cell zone spaced a substantially uniform distance from the butt end thereof, which machine includes a fruit supporting spindle for turning the fruit with the spindle during peeling of the fruit, the combination therewith of means for severing the seed cells from a fruit while it is on said spindle comprising a plurality of fins on said spindle each having an arcuate outer edge so that all of said fins are confined for turning with said spindle within a sphere comparable to the seed cell zone of the fruit, gauge means at the base of said spindle and spaced from said fins a distance comparable to the spacing of the seed cell zone of a fruit from the butt end thereof for engaging the butt end of a fruit to thereby register said fins with the seed cell zone of said fruit, and fruit engaging means arranged for oscillation toward and from said spindle for engaging said fruit for resisting turning thereof with said spindle and fins whereby said fins sever the seed cells from said fruit.

7. In a machine for preparing a fruit having a seed cell zone spaced a substantially uniform and predetermined distance from the calyx end of said fruit, which machine includes a fruit supporting spindle having a plurality of radially extending fins thereon so shaped as to concertedly occupy a space comparable to the seed cell zone of a fruit; the combination with fruit supporting means reciprocable toward and from the free end of said spindle for impaling a fruit thereonto bulb end first of means for registering the seed cell zone of said fruit with said fins incident to impalement of sail fruit on said spindle comprising gauge means adjacent the base of said spindle and spaced from the fins thereon a distance comparable to the distance between the seed cell zone and calyx end of a fruit, and for engaging the calyx end of said fruit as it is impaled upon said spindle with said gauge means, and means operatively connecting said gauging means with said reciprocable means for staying advancement of the latter toward said spindle when the calyx end of the fruit engages said gauging means.

8. In a machine for preparing a fruit having a seed cell zone substantially uniformly spaced a predetermined distance from the calyx end thereof, which machine includes a peeling means and a fruit supporting and coring spindle having a plurality of fins thereon confined within a space comparable to the seed cell zone of a fruit for turning the fruit with said spindle during peeling of the fruit by said peeling means, the combination therewith of means for seed celling said fruit while it is on said spindle, comprising a fruit support for supporting a fruit with its stem-blossom axis in substantial alignment with the axis of said spindle, a reciprocating feed carriage arranged for reciprocation toward and from said spindle once in each cycle of operation of the machine, a fruit engaging cup mounted on said feed carriage for lost motion sliding relative thereto in the direction of reciprocation thereof, means for coupling said carriage and cup for advancing the latter into engagement with the fruit supported on said fruit support for urging said fruit thereon onto said spindle, gauge means adjacent the base end of said spindle and spaced rearwardly of said fins a distance comparable to said predetermined distance between the seed cell zone and calyx end of a fruit for engaging the calyx end thereof when the seed cell zone of said fruit is in register with said fins, a trip mechanism operatively connecting said gauging means and said coupling means for uncoupling of said cup from said feed carriage when said gauging means is engaged by the calyx end of the advancing fruit to thereby stay further advancement of said cup and the fruit engaged thereby irrespective of continued movement of said feed carriage in the direction toward said spindle, and fruit gripping means oscillating toward and from said spindle once in each cycle of operation of and in timed relation with said feed carriage for engaging said fruit subsequent to peeling thereof for holding said fruit against turning with said spindle and fins.

9. In a pear preparation machine including a peeling means, the combination with a fruit supporting spindle for turning a fruit during peeling thereof by said peeling means, of means for seed celling and halving a fruit thereon, comprising a plurality of radially extending fins on said spindle having arcuate outer edges confined within a space comparable to that in which the seed cells of a fruit are confined, said fins being disposed on said spindle for registration with the seed cell zone of a fruit thereon for turning said fruit during the peeling operation, and fruit holding means oscillating toward and from said spindle for holding said fruit for restraining turning thereof with said spindle once during each cycle of operation of said machine whereby said fins sever the seed cells from said fruit.

10. In a pear preparation machine including a peeling means, the combination with a fruit supporting spindle for turning a fruit during peeling thereof by said peeling means, of means for seed celling and halving a fruit thereon, comprising a plurality of radially extending fins on said spindle having arcuate outer edges confined within a space comparable to that in which the seed cells of a fruit are confined, said fins being disposed on said spindle for registration with the seed cell zone of a fruit thereon for turning said fruit during the peeling operation, and means for holding said fruit for restraining turning thereof with said spindle whereby said fins sever the seed cells from said fruit, said holding means including fruit halving knives the blades of which are disposed for oscillation toward and from said spindle, and means for oscillating said knife blades toward said spindle in steps to cause said blades to enter said fruit but partially for temporarily restraining turning of the fruit during the seed celling operation thereof and for subsequently advancing said blades to said spindle for separating the fruit thereon into halves for releasing said halves from said spindle.

11. In a pear preparation machine including a peeling means, the combination with a fruit supporting spindle for turning a fruit during peeling thereof by said peeling means, of means for seed celling and halving a fruit thereon, comprising a plurality of radially extending fins on said spindle having arcuate outer edges confined within a space comparable to that in which the seed cells of a fruit are confined, said fins being disposed on said spindle for registration with the seed cell zone of a fruit thereon for turning said fruit during the peeling operation, and means for holding said fruit for restraining turning thereof with said spindle whereby said fins sever the seed cells from said fruit, said holding means including fruit halving knives the blades of which are disposed for oscillation toward and from said spindle, and means for oscillating said knife blades toward said spindle in steps to cause said blades to enter said fruit but partially for temporarily restraining turning of the fruit during the seed celling operation thereof and for subsequently advancing said blades to said spindle for separating the fruit thereon into halves for releasing said halves from said spindle, and yieldable means carried by one of said knife blades adapted to yieldably engage a fruit impaled upon said spindle for urging the severed halves of fruit away from said knife blades.

12. In a pear preparation machine including a peeling means, the combination with a spindle for turning a fruit during peeling thereof by said peeling means, of means for seed celling and halving a fruit thereon, comprising a plurality of radially extending fins on said spindle confined within a space comparable to that in which the seed cells of a fruit are confined, said fins being disposed on said spindle for registration with the seed cell zone of a fruit thereon for turning said fruit during the peeling operation, and means for holding said fruit for restraining turning thereof with said spindle whereby said fins sever the seed cells from said fruit, said holding means including fruit gripping means for embracing the side walls of the fruit on said spindle once in each cycle of operation of said machine, fruit halving knives the blades of which are disposed for oscillation toward and from said spindle, means for oscillating said knife blades toward said spindle in steps to cause said blades to enter said fruit but partially during embracing of the side walls of said fruit by said fruit gripping means for temporarily restraining turning of the fruit during the seed celling operation thereof, and for subsequently advancing said blades to said spindle during release of a fruit by said fruit gripping means for separating the fruit into halves for releasing said halves from said spindle.

13. In a pear preparation machine having a horizontally disposed fruit turning spindle and a reciprocating feed carriage for urging a pear onto the same, the combination therewith of means for orienting a pear for movement onto said spindle bulb end first comprising means for supporting a pear with its stem-blossom axis substantially coaxial relative to said spindle when said feed carriage is retracted relative to the same, an oscillating carriage movable toward said supporting means when said feed carriage is retracted and away from said supporting means when said feed carriage moves toward said spindle, a feed cup on said oscillating carriage and adapted to receive a pear bulb end first when said feed carriage is disposed away from said supporting means, said feed cup comprising an open ended cylindrical body having one side thereof remote from said spindle open for admitting the neck end of a pear, gate means normally closing the bottom of said cup for supporting a pear therein, and means on said feed carriage for urging said gate means to open relation relative to said cup when said feed carriage is retracted relative to said spindle for discharging the pear from said cup onto said supporting means.

14. In a pear preparation machine having a horizontally disposed spindle and a reciprocating feed carriage for urging a pear onto the same, the combination therewith of means for orienting a pear for movement onto said spindle bulb end first comprising means for supporting a pear with its stem-blossom axis substantially coaxial relative to said spindle when said feed carriage is retracted relative to the same, an oscillating carriage movable toward said supporting means when said feed carriage is retracted and away from said supporting means when said feed carriage moves toward said spindle, a feed cup on said oscillating carriage and adapted to receive a pear bulb end first when said feed carriage is disposed away from said supporting means, said feed cup comprising an open ended cylindrical body having one side thereof remote from said spindle open for admitting the neck end of a pear, gate means normally closing the bottom of said cup for supporting a pear therein, means on said gate means for tractionally engaging the butt end of a pear supported in said cup for turning said pear in a direction to admit its neck end through the open side of said cup, and means on said feed carriage for urging said gate means to open relation relative to said cup when said feed carriage is retracted relative to said spindle for discharging the pear from said cup onto said supporting means.

15. In a pear preparation machine having a horizontally disposed fruit turning spindle and a reciprocating feed carriage for urging a pear onto the same, the combination therewith of means for orienting a pear for movement onto said spindle bulb end first comprising means for supporting a pear with its stem-blossom axis substantially coaxial relative to said spindle when said feed carriage is retracted relative to the same, an oscillating carriage movable toward said supporting means when said feed carriage is retracted and away from said supporting means when said feed carriage moves toward said spindle, a feed cup on said oscillating carriage and adapted to receive a pear bulb end first when said feed carriage is disposed away from said supporting means, said feed cup comprising an open-ended cylindrical body having one side thereof remote from said spindle open for admitting the neck end of a pear, gate means normally closing the bottom of said cup for supporting a pear therein, a detent on said gate means engageable in the calix cavity of the butt end of a pear supported in said cup for turning said pear in a direction to admit its neck end through the open side of said cup, and means on said feed carriage for urging said gate means to open relation relative to said cup when said feed carriage is retracted relative to said spindle for discharging the pear from said cup onto said supporting means.

16. In a pear preparation machine including a spindle, means for supporting a pear for impalement of said spindle and a reciprocating feed carriage movable toward and from said spindle for urging a pear on said supporting means onto said spindle; the combination therewith of a fruit receiving and semi-orienting means for depositing a pear onto said fruit supporting means with its stem-blossom axis in substantial coaxial alignment with said spindle comprising an oscillating carriage movable toward said fruit supporting means when said feed carriage is moving away from said spindle and movable away from said supporting means when said feed carriage urges the fruit toward said spindle, a feed cup on said oscillating carriage having an open bottom and an open side wall providing a passage disposed in a vertical plane coincident with the axis of said spindle for admitting the neck end of a pear toward the same, gate means on said feed cup normally closing the bottom thereof for supporting a pear therein, and means engageable by said feed carriage as it moves away from said spindle for moving said gate means to open position relative to said feed cup for discharging a pear therefrom onto said supporting means.

17. In a pear preparation machine including a spindle, means for supporting a pear for impalement on said spindle, and a reciprocating feed carriage movable toward and from said spindle for urging a pear on said supporting means onto said spindle; the combination therewith of a fruit receiving and semi-orienting means for depositing a pear onto said fruit supporting means with its stem-blossom axis in substantial coaxial alignment with said spindle comprising an oscillating carriage movable toward said fruit supporting means when said feed carriage is moving away from said spindle and movable away from said supporting means when said feed carriage urges the fruit toward said spindle, a feed cup on said oscillating carriage having an open bottom and an open side wall providing a passage disposed in a vertical plane coincident with the axis of said spindle for admitting the neck end of a pear toward the same, gate means on said feed cup normally closing the bottom thereof for supporting a pear therein, means engageable by said feed carriage as it moves away from said spindle for moving said gate means to open position relative to said feed cup, and means on said gate means for engaging a pear deposited stem end up in said feed cup for turning said pear in a direction to admit its neck end through the passage provided in the side wall of said feed cup for discharging a pear therefrom onto said supporting means.

18. In a pear preparation machine including a peeling means, the combination with a fruit supporting spindle for turning a fruit during peeling thereof by said peeling means, of means for seed celling and halving a fruit thereon, comprising a plurality of radially extending fins on said spindle occupying a space comparable to that in which the seed cells of a fruit are confined and disposed on said spindle for registration with the seed cell zone of a fruit thereon for turning said fruit during the peeling operation, a pair of fruit halving knives the blades of which are disposed for oscillation toward and from each other coincident with the axis of said spindle, and means for oscillating said knife blades toward said spindle in steps to cause said blades to enter said fruit but partially for temporarily restraining turning of the fruit during seed celling thereof and for subsequently advancing said blades to said spindle for separating the fruit thereon into halves for releasing said halves from said spindle.

19. In a pear preparation machine including a peeling means, the combination with a fruit supporting spindle for turning a fruit during peeling thereof by said peeling means, of means for seed celling and halving a fruit thereon, comprising a plurality of radially extending fins on said spindle occupying a space comparable to that in which the seed cells of a fruit are confined and disposed on said spindle for registration with the seed cell zone of a fruit thereon for turning said fruit during the peeling operation, a pair of fruit halving knives the blades of which are disposed for oscillation toward and from each other coincident with the axis of said spindle, means for oscillating said knife blades toward said spindle in steps to cause said blades to enter said fruit but partially for temporarily restraining turning of the fruit during seed celling thereof and for subsequently advancing said blades to said spindle for separating the fruit thereon into halves for releasing said halves from said spindle, and yieldable means carried by one of said knives for yieldably engaging a fruit impaled upon said spindle for urging the severed halves of fruit away from said knife blades.

20. The combination with a fruit supporting spindle for a fruit preparation machine of means for coupling a fruit with said spindle for turning movement therewith comprising: a plurality of fins disposed on said spindle to occupy a space comparable to the seed cell zone of a fruit impaled thereon, each of said fins extending radially from said spindle and having a slight forward tilt diametrically thereof in the direction of rotation of said spindle to thereby provide a forwardly tending wedge-like pocket between adjacent fins adapted to receive the seeds, fibres and pulp of the seed cell zone of the fruit impaled upon said spindle for urging said seeds, fibres and pulp of the seed cell zone of the fruit radially inward relative to said spindle during turning thereof.

21. The combination with a fruit supporting spindle for a fruit preparation machine of fruit coupling means on said spindle comprising: a plurality of fins disposed on said spindle to occupy a space comparable to the seed cell zone of a fruit impaled thereon, each of said fins extending radially from said spindle and having a slight forward tilt diametrically thereof in the direction of rotation of said spindle to thereby provide a forwardly tending wedge-like pocket between adjacent fins adapted to receive the seeds, fibres and pulp of the seed cell zone of the fruit impaled upon said spindle for urging said seeds, fibres and pulp of the seed cell zone of the fruit radially inward relative to said spindle during turning thereof to thereby maintain said seeds, fibres and pulp within the seed cell zone of said fruit when said fruit is restrained against turning with said spindle for severing the seed cells from said fruit.

22. In a fruit preparation machine having a fruit supporting spindle provided with radially extending fins for coupling a fruit with said spindle for turning said fruit therewith, the combination therewith of means for seed celling the fruit while it is impaled upon said spindle comprising gauging means arranged adjacent the base end of said spindle in predetermined distance rearwardly from said coupling fins on said spindle for stopping a fruit when its seed cell zone is in registration with the fruit coupling fins on said spindle, each of said fins having an arcuate outer edge so that all of said fins occupy a sphere comparable to the seed cell zone of a fruit impaled upon said spindle, and fruit engaging means for restraining turning movement of said fruit with said spindle and coupling fins whereby the latter severs the seed cell zone from the main body of said fruit.

23. In a fruit preparation machine including a peeling means having a fruit supporting spindle provided with a plurality of radially extending fins for coupling a fruit with said spindle for turning therewith during peeling of such fruit, the combination therewith of means for seed celling said fruit while it is still impaled upon said spindle comprising an arcuate peripheral edge on each of said fins whereby all of said fins collectively conform to a sphere comparable to the seed cell zone of said fruit, each of said fins being tilted forwardly relative to the direction of turning of said spindle for maintaining seeds, fibres and pulp within the seed cell zone of said fruit when the latter is restrained against turning with said spindle.

24. In a machine for preparing fruit of the type having a seed cell zone spaced a substantially uniform distance from its calyx end, which machine includes a fruit supporting spindle having a plurality of fins thereon so shaped as to be concertedly confined within a space comparable to the space occupied by the seed cell zone of a fruit for turning said fruit with the spindle, the combination therewith of means for registering the seed cell zone of a fruit with said fins as such fruit is impaled upon said spindle comprising means for advancing a fruit calyx end first onto said spindle including a reciprocating feed carriage, a fruit engaging cup and means for coupling said cup to said carriage for movement therewith toward said spindle for advancing the fruit onto the same, gauge means adjacent the base end of said spindle and spaced from the fins thereon said predetermined distance between the seed cell zone and calyx end of said fruit for engaging the calyx end thereof when the seed cell zone of the fruit is in register with said fins, a trip mechanism operatively connecting said gauge means and said coupling means for uncoupling said cup from said feed carriage upon engagement of said gauge means by the calyx end of a fruit for staying advancement of said cup toward said spindle irrespective of continued movement of said reciprocating feed carriage toward the spindle.

25. In a pear preparation machine having a horizontally disposed fruit supporting spindle and a reciprocating carriage for feeding a pear onto the free end of said spindle, the combination therewith of means for positioning a pear for movement onto said spindle bulb end first and with its stem-blossom axis in axial alignment with the axis of said spindle comprising: a pair of guide means each disposed equidistant to either side of the path of movement of said reciprocating carriage and spaced from each other to engage and support the bulb end of a pear deposited between them, means on said guide means for engaging the stem end of a pear deposited thereon to dispose the stem-blossom axis of said pear in substantial alignment with said guide means, a fruit engaging bell on said reciprocating carriage having its axis of flare aligned with the axis of said spindle for centering the stem end of said pear therewith, said guide means terminating in spaced relation to the free end of said spindle, and yieldable means disposed between said spindle and said guide means for receiving the bulb end of said pear therefrom and for centering the calyx cavity of said pear with the axis of said spindle incident to advancement of said reciprocating carriage and said pear toward said spindle.

26. In a pear preparation machine having a horizontally disposed fruit supporting spindle and a reciprocating feed cup for feeding a pear onto the free end of said spindle in axial alignment therewith, the combination therewith of means for positioning a pear for movement onto said spindle bulb end first with its stem-blossom axis coaxial with the axis of said spindle comprising: a pair of guide means each disposed equidistant to either side of the path of movement of said reciprocating feed cup and spaced from each other to engage and support the bulb end of a pear in substantial alignment with the axis of said spindle and said feed cup, means on said guide means for engaging the neck end of a pear deposited thereon to support the stem end of said pear in substantial alignment with said spindle and said feed cup, said feed cup having a flared open mouth for engaging the stem end of said pear to thereby center the stem end of said pear with the axis of said spindle, said guide means terminating in spaced relation to the free end of said spindle, and centering means disposed between said spindle and guide means comprising a pair of half funnels yieldably urged toward the axis of said spindle for receiving the bulb end of said pear from said guide means for centering the calyx cavity of said pear with the axis of said spindle incident to advancement of said feed cup and said pear toward said spindle.

27. In a pear preparation machine having a horizontally disposed fruit supporting spindle and a feed cup reciprocating in axial alignment with said spindle for feeding a pear onto the free end of the spindle, the combination therewith of means for positioning a pear for movement onto said spindle bulb end first with its stem-blossom axis coaxial with the axis of said spindle comprising: a pair of guide means each disposed equidistant to either side of the path of movement of said reciprocating carriage and spaced from each other to engage the bulb end of a pear deposited between them, means on said guide means for supporting the stem end of a pear deposited thereon to dispose its stem-blossom axis in substantial parallelism with said guide means, an oscillating carriage movable toward said guide means when said feed cup is retracted relative to said spindle and away from said guide means when said feed cup is moved toward said spindle, a fruit receiver on said oscillating carriage adapted to receive a pear bulb end first when disposed away from said guide means, said fruit receiver having an open bottom and having one side thereof remote from said spindle open for admitting the neck end of a pear to pass therethrough, gate means normally closing the open bottom of said fruit receiver for supporting a pear deposited therein, means carried by said reciprocating feed cup for urging said gate means into open position relative to said fruit receiver for depositing a pear onto said guide means with its bulb portion facing said spindle and its stem end facing said feed cup, said guide means terminating in spaced relation to the free end of said spindle, and yieldable means disposed between said spindle and said guide means for receiving the bulb end of said pear therefrom and for centering the calyx cavity of said pear with the axis of said spindle incident to advancement of said reciprocating feed cup and said pear toward said spindle.

28. In a pear preparation machine having a horizontally disposed fruit supporting spindle and a feed cup reciprocating in axial alignment with said spindle for feeding a pear onto the free end of the spindle, the combination therewith of means for positioning a pear for movement onto said spindle bulb end first with its stem-blossom axis coaxial with the axis of said spindle comprising: a pair of guide means each disposed equidistant to either side of the path of movement of said reciprocating carriage and spaced from each other to engage the bulb end of a pear deposited between them, means on said guide means for supporting the stem end of a pear deposited thereon to dispose its stem-blossom axis in substantial parallelism with said guide means, an oscillating carriage movable toward said guide means when said feed cup is retracted relative to said spindle and away from said guide means when said feed cup is moved toward said spindle, a fruit receiver on said oscillating carriage adapted to receive a pear bulb end first when disposed away from said guide means, said fruit receiver having an open bottom and having one side thereof remote from said spindle open for admitting the neck end of a pear to pass therethrough, gate means normally closing the open bottom of said fruit receiver for supporting a pear deposited therein, means carried by said reciprocating feed cup for urging said gate means into open position relative to said fruit receiver for depositing a pear onto said guide means with its bulb portion facing said spindle and its stem end facing said feed cup, said guide means terminating in spaced relation to the free end of said spindle, and centering means disposed between said spindle and guide means comprising a pair of half funnels yieldably urged toward the axis of said spindle for receiving the bulb end of said pear from said guide means for centering the calyx cavity of said pear with the axis of said spindle incident to advancement of said feed cup and said pear toward said spindle.

29. In a pear preparation machine, the combination with a fruit supporting spindle for turning a fruit during peeling thereof, of means for seed celling a fruit thereon, comprising a plurality of radially extending fins on said spindle occupying a space substantially comparable to that in which the seed cells of a fruit are confined and disposed on said spindle for registration with the seed cell zone of a fruit thereon for turning said fruit during the peeling operation, and fruit holding means for engaging said fruit while it is yet on said spindle for resisting turning of said fruit with said spindle and fins whereby said fins sever the seed cells from said fruit.

30. In a pear preparation machine, the combination with a fruit supporting spindle of means for seed celling fruit thereon, comprising a plurality of fins on said spindle confined within a space comparable to the seed cell zone of a fruit impaled upon said spindle, said fins being disposed on said spindle for registration with the seed cell zone of a fruit thereon, and means for holding a fruit while on said spindle for restraining turning of such fruit with said spindle whereby said fins sever the seed cells from the fruit.

31. In a pear preparation machine, the combination with a fruit supporting spindle of means for seed celling fruit thereon, comprising a plurality of fins on said spindle confined within a space comparable to the seed cell zone of a fruit impaled upon said spindle, said fins being disposed on said spindle for registration with the seed cell zone of a fruit thereon, a pair of fruit halving knives the blades of which are disposed for oscillation toward and from each other coincident with the axis of said spindle, and means for oscillating said knife blades toward said spindle in steps to cause said blades to enter said fruit but partially for temporarily restraining turning of the fruit during turning of said spindle, its fins and the seed cell zone of the fruit relative to the remaining body of the fruit surrounding the seed cell zone thereof and for subsequently advancing said blades to said spindle for separating the fruit thereon into halves for releasing said halves from said spindle.

References Cited in the file of this patent

UNITED STATES PATENTS

| | | |
|---|---|---|
| 1,002,242 | Ehrhardt | Sept. 5, 1911 |
| 1,217,791 | Luther | Feb. 27, 1917 |
| 1,505,488 | Piermattei | Aug. 19, 1924 |
| 2,056,413 | Thompson et al. | Oct. 6, 1936 |
| 2,187,075 | Coons | Jan. 16, 1940 |
| 2,382,134 | Coons | Aug. 14, 1945 |
| 2,447,640 | Dunn | Aug. 24, 1948 |